United States Patent
Fujita

(10) Patent No.: US 10,270,548 B2
(45) Date of Patent: Apr. 23, 2019

(54) TARGET OPERATION DEVICE COMMUNICATING SYSTEM, MOBILE TERMINAL, AND TARGET OPERATION DEVICE COMMUNICATION COOPERATING METHOD

(71) Applicant: MAXELL, LTD., Kyoto (JP)

(72) Inventor: Kouji Fujita, Tokyo (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 16/060,429

(22) PCT Filed: Dec. 10, 2015

(86) PCT No.: PCT/JP2015/084667
§ 371 (c)(1),
(2) Date: Jun. 8, 2018

(87) PCT Pub. No.: WO2017/098633
PCT Pub. Date: Jun. 15, 2017

(65) Prior Publication Data
US 2019/0007149 A1    Jan. 3, 2019

(51) Int. Cl.
*H04M 1/60* (2006.01)
*H04M 9/00* (2006.01)
(Continued)

(52) U.S. Cl.
CPC ......... *H04B 17/382* (2015.01); *H04B 17/318* (2015.01); *H04M 1/7258* (2013.01);
(Continued)

(58) Field of Classification Search
CPC .... G06F 3/167; G06M 11/3163; G10L 15/22; G10L 2015/225; H04L 67/18;
(Continued)

(56) References Cited

U.S. PATENT DOCUMENTS

| | | | |
|---|---|---|---|
| 10,083,006 B1* | 9/2018 | Feuz | G06F 3/167 |
| 2005/0213723 A1* | 9/2005 | Chung | H04M 3/387 379/201.06 |
| 2006/0035635 A1* | 2/2006 | Kumagai | H04M 1/274575 455/426.2 |
| 2006/0240771 A1* | 10/2006 | Graves | G06Q 50/22 455/39 |

(Continued)

FOREIGN PATENT DOCUMENTS

| | | |
|---|---|---|
| EP | 3110118 A1 | 12/2016 |
| JP | 11-284753 A | 10/1999 |

(Continued)

OTHER PUBLICATIONS

International Search Report of PCT/JP2015/084667 dated Mar. 8, 2016.

*Primary Examiner* — Binh Kien Tieu
(74) *Attorney, Agent, or Firm* — Mattingly & Malur, PC

(57) ABSTRACT

A permissible range of a mobile terminal that operates in cooperation with a target operation device in accordance with a user's whereabouts in a house is dynamically switched. An intercom has a function permission number control unit that generates calling information to require a cooperated operation to be carried out with the mobile terminal. The mobile terminal includes a function permission number storing unit and a CPU. The function permission number storing unit stores function permission numbers respectively set to mobile terminals. When a function permission number transmitted from the intercom is received, the CPU determines whether the function permission number coincides with a function permission number of a function permission information storing unit or not, and sets an application for carrying out the cooperated operation with the intercom to active in a case where they coincide with each other.

15 Claims, 15 Drawing Sheets

(51) Int. Cl.
*H04B 17/382* (2015.01)
*H04W 64/00* (2009.01)
*H04M 1/725* (2006.01)
*H04Q 9/02* (2006.01)
*H04B 17/318* (2015.01)

(52) U.S. Cl.
CPC .............. *H04M 9/001* (2013.01); *H04Q 9/02* (2013.01); *H04W 64/003* (2013.01)

(58) Field of Classification Search
CPC . H04L 65/1069; H04L 67/12; H04N 21/4788; H04N 7/147; H04W 4/80
USPC ............ 379/167.05, 167.08, 167.11, 167.12, 379/167.14, 171; 455/404.2, 414.2, 424, 455/426.1, 426.2, 456, 456.6, 550.1
See application file for complete search history.

(56) References Cited

U.S. PATENT DOCUMENTS

| | | | |
|---|---|---|---|
| 2009/0015711 | A1* | 1/2009 | Yamamoto ............. H04N 7/186 348/441 |
| 2014/0112321 | A1* | 4/2014 | Larson ................ H04L 65/1069 370/338 |
| 2017/0135889 | A1* | 5/2017 | Omi ........................ A61G 12/00 |
| 2018/0286157 | A1* | 10/2018 | Simcik .................. G05B 15/02 |

FOREIGN PATENT DOCUMENTS

| | | |
|---|---|---|
| JP | 2001-231083 A | 8/2001 |
| JP | 2008-135885 A | 6/2008 |
| JP | 2015-156586 A | 8/2015 |

* cited by examiner

TARGET OPERATION DEVICE COMMUNICATING SYSTEM, MOBILE TERMINAL, AND TARGET OPERATION DEVICE COMMUNICATION COOPERATING METHOD

TECHNICAL FIELD

The present invention relates to a target operation device communicating system, a mobile terminal, and a target operation device communication cooperating method, and more particularly, the present invention relates to a technique effective for a cooperated operation between a target operation device and a mobile terminal.

BACKGROUND ART

In recent years, it comes to a period when all members of family respectively have mobile terminals exemplified as a smartphone. The mobile terminal becomes a terminal that is always placed near a user and without which the user cannot do out of user's home or at home. It is known that the mobile terminal that always exists near the user in this manner can control or monitor a target operation device in a house by using an application.

As a technique to control electric appliances by this type of mobile terminal, for example, there is one in which a mobile terminal is caused to function as a slave unit of a land-line phone installed in a house. A dedicated application is installed to the mobile terminal. The mobile terminal is connected to the land-line phone via a wireless LAN or the like, for example.

Further, it is known a technique to turn on or off electric appliances by means of a cellular phone or the like (see Patent Document 1, for example). In this technique of Patent Document 1, for example, when it is detected that a mobile terminal reaches a house by using location information of the mobile terminal and it is night, lighting or the like located in a living room of the house is turned on.

RELATED ART DOCUMENTS

Patent Documents

Patent document 1: Japanese Patent Application Publication No. 2001-231083

SUMMARY OF THE INVENTION

Problems to be Solved by the Invention

However, in the technique of Patent Document 1 described above, an operation permissible range cannot be set to the mobile terminal. For this reason, each of target operation devices whose operation is fixedly set in advance is activated independently with respect to all of mobile terminals in the house, and this is not realistic. It is hard to say that a fine control and a reception response suitable for every user of each of the mobile terminals can be carried out for the target operation device.

Further, in the technique to cause the mobile terminal to function as the slave unit of the land-line phone, it is not effective that calling from the land-line phone is delivered to all of the mobile terminals of the family. In a household in which a child such as a primary school child is also caused to have a mobile terminal, incoming call to the land-line phone is also transferred to the mobile terminal of the child as calling for reception.

It is thought that most of callings to the land-line phone relates to matters to any of parents even in a case where the child has the mobile terminal. In particular, in case of a cold calling or the like, the child may not answer the phone in a case where any parent is at home.

It is an object of the present invention to provide a technique capable of dynamically switching a permissible range of a mobile terminal that operates in cooperation with a target operation device in accordance with respective users of mobile terminals in a family or locations of the users in a house.

The foregoing and other objects, and new features of the present invention will become more apparent from the detailed description of the present specification and the appending drawings.

Means for Solving the Problem

An outline of representative invention of the present invention disclosed in the present application will briefly be explained as follows.

Namely, a representative target operation device communicating system includes a target operation device, and mobile terminals configured to operate in cooperation with the target operation device by communicating with the target operation device. The target operation device includes a function permission information control unit and a first communicating unit. The function permission information control unit generates cooperation information and first function permission information when to carry out a cooperated operation with any of the mobile terminals, the cooperation information being used to require the cooperated operation with the corresponding mobile terminal. The first communicating unit transmits the cooperation information and the first function permission information generated by the function permission information control unit to the corresponding mobile terminal.

Each of the mobile terminals includes a function permission information storing unit, an application storing unit, a control unit, and a second communicating unit. The function permission information storing unit stores second function permission information set to the mobile terminal. The application storing unit stores an application to carry out a cooperated operation with the target operation device.

The control unit determines, when the first function permission information transmitted from the first communicating unit is received, whether the received first function permission information coincides with the second function permission information stored in the function permission information storing unit; and sets the application stored in the application storing unit to active in a case where the first function permission information coincides with the second function permission information. The second communicating unit receives the first function permission information transmitted by the first communicating unit.

The first function permission information is information that specifies the mobile terminal with which the target operation device carries out the cooperated operation, and the second function permission information is information that indicates a function permission order when the target operation device carries out the cooperated operation.

Further, the target operation device includes a transmitting unit and a function permission information determining unit. The transmitting unit transmits a test wave to each of the mobile terminals. The function permission information determining unit determines the second function permission information on the basis of the receiving intensity of the test wave transmitted by the second communicating unit.

Moreover, the mobile terminal includes a receiving unit and a measuring unit. The receiving unit is configured to receive the test wave transmitted by the transmitting unit. The measuring unit measures receiving intensity of the test wave received by the receiving unit. The function permission information determining unit determines the second function permission information so that the function permission order becomes higher in order from the mobile terminal with the strongest receiving intensity of the test wave. The second function permission information stored in the function permission information storing unit is the second function permission information determined by the function permission information determining unit.

Effects of the Invention

Effects obtained by representative invention of the present invention disclosed in the present application will briefly be explained as follows.

It is possible to improve convenience of a target operation device.

BRIEF DESCRIPTIONS OF THE DRAWINGS

DETAILED DESCRIPTION OF EMBODIMENTS

Figure 1:
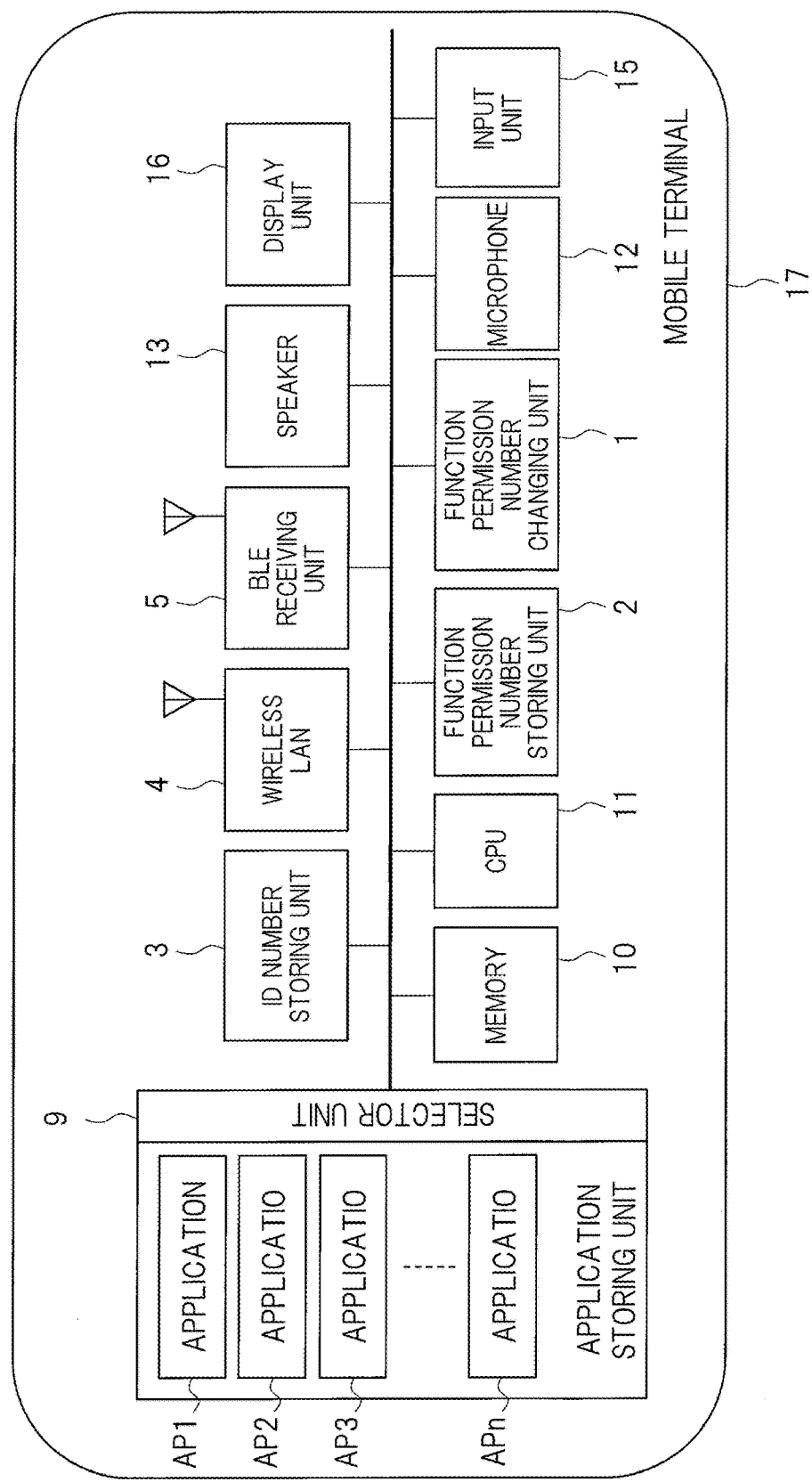
FIG. 1 is an explanatory drawing showing one example of a configuration of a mobile terminal included in a target operation device communicating system according to a first embodiment.

In embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Further, in the embodiments described below, in a case of referring to the number of elements (including number of pieces, values, amount, range, and the like), the number of the elements is not limited to a specific number unless otherwise stated or except the case where the number is apparently limited to a specific number in principle, and the number larger or smaller than the specified number may also be applicable.

Moreover, in the embodiments described below, it goes without saying that the components (including element steps and the like) are not always indispensable unless otherwise stated or except the case where the components are apparently indispensable in principle.

Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Further, the same components are in principle denoted by the same reference numeral throughout the drawings for describing the embodiments, and the repetitive description thereof will be omitted.

Hereinafter, the embodiments will be described in detail.

First Embodiment

<Outline>

A target operation device communicating system is constructed by a target operation device and a mobile terminal configured to operate the target operation device. The mobile terminal is a smartphone, a tablet or the like, for example. The mobile terminal functions as a remote controller, such as a slave unit terminal of an intercom that is a target operation device, a slave unit terminal of a land-line phone, an operation terminal of an air conditioner, an operation terminal of lighting, and an operation terminal of a television, by making an application resident on a memory.

A permissible range of a plurality of mobile terminals is then changed dynamically. In particular, a permissible range of operation authority of each of the mobile terminals is dynamically changed in accordance with a location of the mobile terminal, an attribute of an owner of the mobile terminal, or an activity state of the mobile terminal and the like.

<Configuration Example of Mobile Terminal>

FIG. 1 is an explanatory drawing one example of a configuration of the mobile terminal included in the target operation device communicating system according to the first embodiment.

The target operation device communicating system is a system in which a target operation device can be operated via the mobile terminal as described above. The target operation device communicating system includes a mobile terminal 17 shown in FIG. 1 and an intercom 28 shown in FIG. 2.

Here, an example in which an electric appliance is the intercom 28 as one example and the mobile terminal 17 becomes a slave unit of the intercom 28 will be described. Further, a function to become the slave unit of the intercom 28 is achieved by an application AP1 (will be described later).

Further, the application AP1 is executed by a CPU 11 of the mobile terminal 17 as will be described later. Further, the application AP1 can be downloaded via a communication line such as the Internet. Alternatively, it may be configured so as to be installed in the mobile terminal 17 in advance.

Further, functions in the mobile terminal 17 is not limited to the application AP1. Various electric appliances can be operated by the mobile terminal 17 by using other applications.

The mobile terminal 17 is a smartphone or the like, for example. An example in which it becomes a slave unit of an intercom by an application installed in the smartphone will be described. In this regard, the application is not limited to the application of the slave unit of the intercom, and it is also effective for an application to operate the other electric appliances by the mobile terminal 17.

As shown in FIG. 1, the mobile terminal 17 includes a function permission number changing unit 1, a function permission number storing unit 2, an ID number storing unit 3, a wireless LAN (Local Area Network) 4, a BLE receiving unit 5, an application storing unit 6, a selector unit 9, a memory 10, the CPU 11, a microphone 12, a speaker 13, an input unit 15, and a display unit 16.

The function permission number changing unit 1 changes a function permission number for the mobile terminal 17. The function permission number storing unit 2 that is a function permission information storing unit stores function permission numbers that indicate the function permission orders of the mobile terminals 17. The function permission numbers stored in the function permission number storing unit 2 become second function permission information. The ID number storing unit 3 stores characteristic values of the mobile terminals.

The wireless LAN 4 that is a second communicating unit is a wireless communication technology compliant with technical standards such as IEEE 802.11, and exchanges an audio and/or a video via wireless communication. The BLE receiving unit 5 is a receiving unit for short-range wireless, and wireless communication uses a technique such as Bluetooth (registered trademark), for example.

The application storing unit 6 stores applications. Each of the applications is software that a user voluntarily installs to the mobile terminal 17. In FIG. 1, the applications AP1 to APn are stored.

The selector unit 9 selects the applications AP1 to APn stored in the application storing unit 6 on the basis of a control of the CPU 11. The memory 10 is constructed by a semiconductor memory such as a RAM (Random Access Memory), for example, and makes an application resident thereon to operate the application.

The CPU 11 controls an operation of the mobile terminal 17 to execute each of the applications AP1 to APn stored in the application storing unit 6. This CPU 11 becomes a control unit and a measuring unit. An audio is inputted to the microphone 12. An audio and the like are outputted from the speaker 13. Information is inputted via the input unit 15.

The display unit 16 is a display to display a video, information and the like. The display is constructed by a touch panel, for example, and the input unit 15 is constructed by an input screen or the like, which is displayed on the touch panel.

<Configuration Example of Intercom>

Subsequently, a configuration of the intercom 28 will be described.

Figure 2:
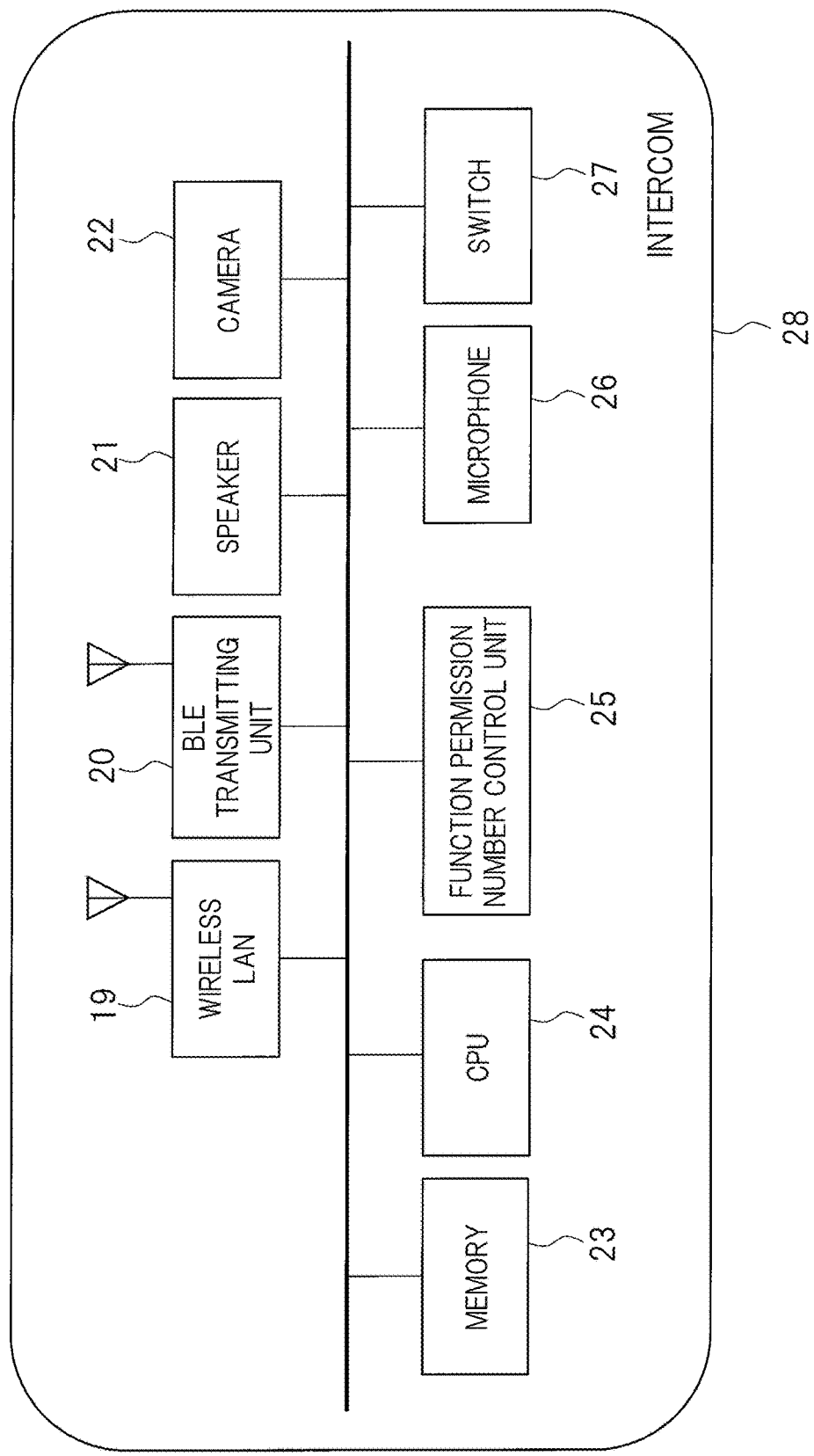
FIG. 2 is an explanatory drawing showing one example of a configuration of an intercom included in the target operation device communicating system according to the first embodiment.

FIG. 2 is an explanatory drawing showing one example of a configuration of the intercom 28 included by the target operation device communicating system according to the first embodiment.

The intercom 28 is an intercom that is to be installed on a front door (or an entrance) and the like, for example. As shown in FIG. 2, the intercom 28 includes a wireless LAN 19, a BLE transmitting unit 20, a speaker 21, a camera 22, a memory 23, a CPU 24, a function permission number control unit 25, a microphone 26, and a switch 27.

The wireless LAN 19 that is a first communicating unit is a wireless communication technology compliant with the technical standards such as IEEE 802.11 as well as the wireless LAN 4 shown in FIG. 1, and exchanges an audio and/or a video via wireless communication. The BLE transmitting unit 20 is a transmitting unit for short-range wireless, for example, and uses a technique such as Bluetooth.

The speaker 21 outputs an audio. The camera 22 photographs a video of a visitor and the like, for example. An operation program of the intercom 28 and the like are stored in the memory 23. The CPU 24 controls an operation of the intercom 28 on the basis of the operation program.

The function permission number control unit 25 that becomes a function permission information control unit and a function permission information determining unit determines a mobile terminal 17 with a high function permission number. An audio is inputted to the microphone 26. The switch 27 is a call switch that rings a bell of the intercom 28.

<Example of Basic Operation of Target Operation Device Communicating System>

Next, an operation of the mobile terminal 17 shown in FIG. 1 and an operation of the intercom 28 shown in FIG. 2 will be described.

Here, a basic operation when the mobile terminal 17 is caused to operate as the slave unit of the intercom by the application will be described. In this regard, the application AP1 is an application to cause the mobile terminal 17 to operate as the slave unit of the intercom. By setting the application AP1 to active, the mobile terminal 17 carries out a cooperated operation with the intercom 28.

The CPU 11 first outputs a control signal to the selector unit 9 to select the application AP1 that is an application to cause it to function as the slave unit of the intercom. The application AP1 selected by the selector unit 9 is stored in the memory 10. When the application AP1 is stored in the memory 10, the CPU 11 starts the application AP1.

By pressing the switch 27 of the intercom 28, a calling signal is transmitted from the wireless LAN 19 of the intercom 28 to the wireless LAN 4 via wireless communication. In a case where the application AP1 coincides with a function permission number (will be described later), a calling sound is outputted from the speaker 13, and an incoming display is displayed on the display unit 16.

Then, when the user inputs an incoming reception button by means of the input unit 15, the intercom 28 transmits a video of the camera via wireless transmission from the wireless LAN 19. The CPU 11 executes a decoding process for the video from the camera 22, which is received by the wireless LAN 4, to display it on the display unit 16. The camera 22 is a camera included in the intercom 28, for example, and photographs a video of a visitor or the like.

When an audio is inputted from the intercom 28, the wireless LAN 19 transmits an audio signal via wireless communication. The CPU 11 decodes the audio signal transmitted via wireless communication and received by the wireless LAN 4 to output it from the speaker 13. The audio signal is inputted from the microphone 26 included in the intercom 28. On the other hand, the audio signal inputted from the microphone 12 is subjected to an encoding process by the CPU 11, and is transmitted to the intercom 28 by the wireless LAN 4.

Subsequently, an operation of the intercom 28 shown in FIG. 2 will be described.

When the switch 27 is operated by the visitor, the intercom 28 installed on the front door or the like starts a calling operation. This causes the calling sound to be outputted from the speaker 13 of the mobile terminal 17 as described above, and causes the incoming display to be displayed on the display unit 16.

In order to call the mobile terminal 17 with high function permission number, the function permission number control unit 25 superimposes information of a function permission number 1 on the calling signal, and transmits the information of the function permission number 1 from the wireless LAN 19. Thus, when the mobile terminal 17 with the function permission number 1 responds thereto, the CPU 24 stops the calling operation, and encodes a video signal photographed by the camera 22 and the audio signal obtained by the microphone 26. Each of the encoded signals is transmitted from the wireless LAN 19. Further, the CPU 24 executes a decoding process for the audio signal transmitted from the mobile terminal 17 to output it from the speaker 13.

Subsequently, operations of the intercom 28 and the mobile terminals 17 when a plurality of mobile terminals 17 is located in a house will be described.

<Setting of Function Permission Numbers and Calling Operation for Mobile Terminals>

Hereinafter, a concrete example of calling to a plurality of mobile terminals 17 from the intercom 28 and assigning of function permission numbers for communication will first be described, and realizing configuration thereof will be described. Here, each of the mobile terminals 17 constructed by a smartphone or the like is used as the slave unit of the intercom 28.

In this regard, in an assigning process of function permission numbers and a calling process, which will be described below, processes of respective functions are executed on the basis of software of a program form, which is stored in a program storing memory or the like (not shown in the drawings) that is provided in each of the mobile terminal 17 and the intercom 28.

These kinds of software are respectively executed by the CPU 11 of the mobile terminal 17 and the CPU 24 of the intercom 28. Further, the software for executing the functions described above may be downloaded via a communication line such as the Internet. Alternatively, it may be configured so that these types of software are respectively installed in advance in the mobile terminal 17 and the intercom 28.

Figure 3:
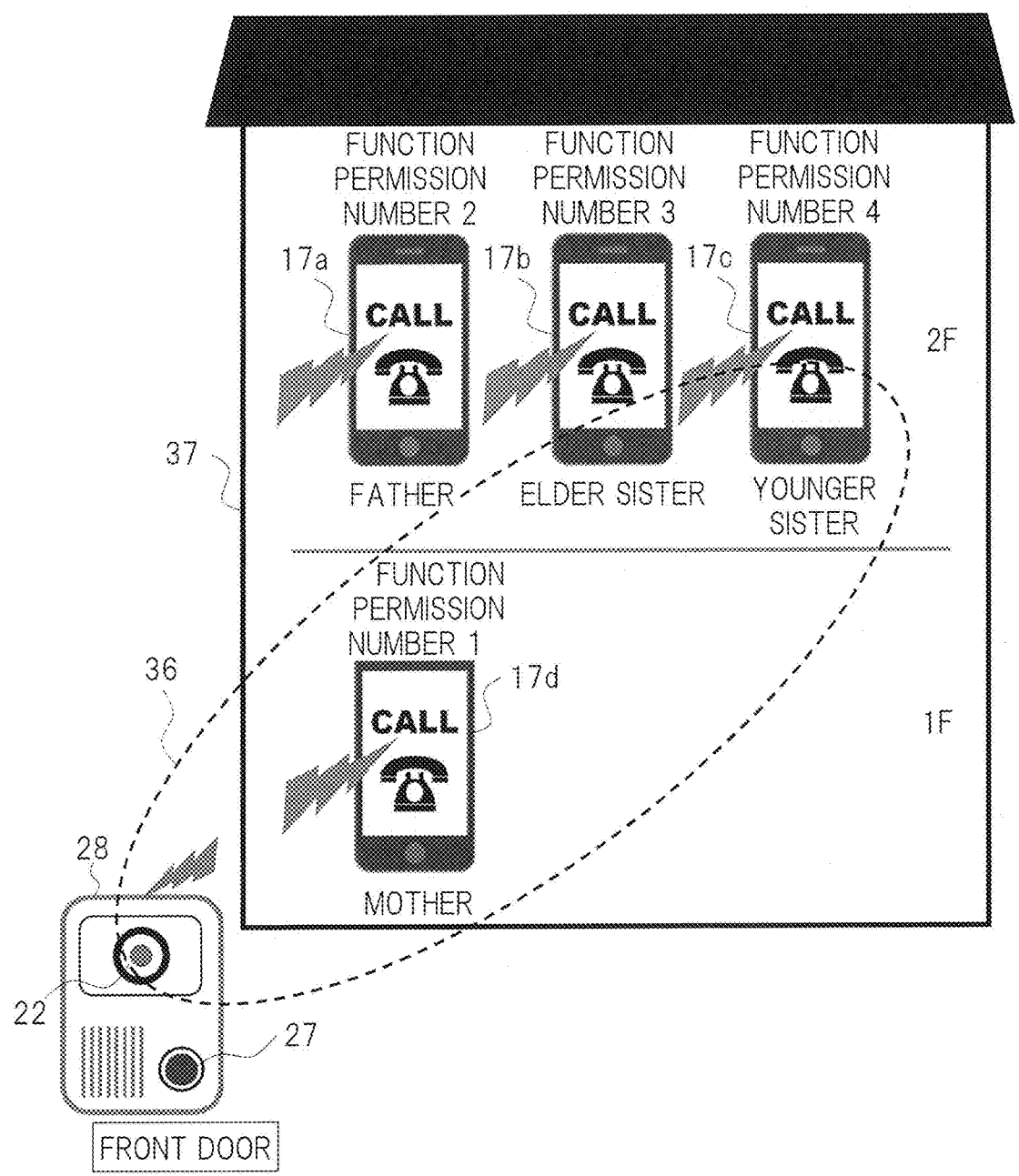
FIG. 3 is an explanatory drawing showing one example of a positional relationship among the intercom and a plurality of mobile terminals.

FIG. 3 is an explanatory drawing showing one example of a positional relationship among the intercom 28 and the plurality of mobile terminals 17. Further, FIG. 4 is an explanatory drawing showing another example of FIG. 3.

Figure 4:
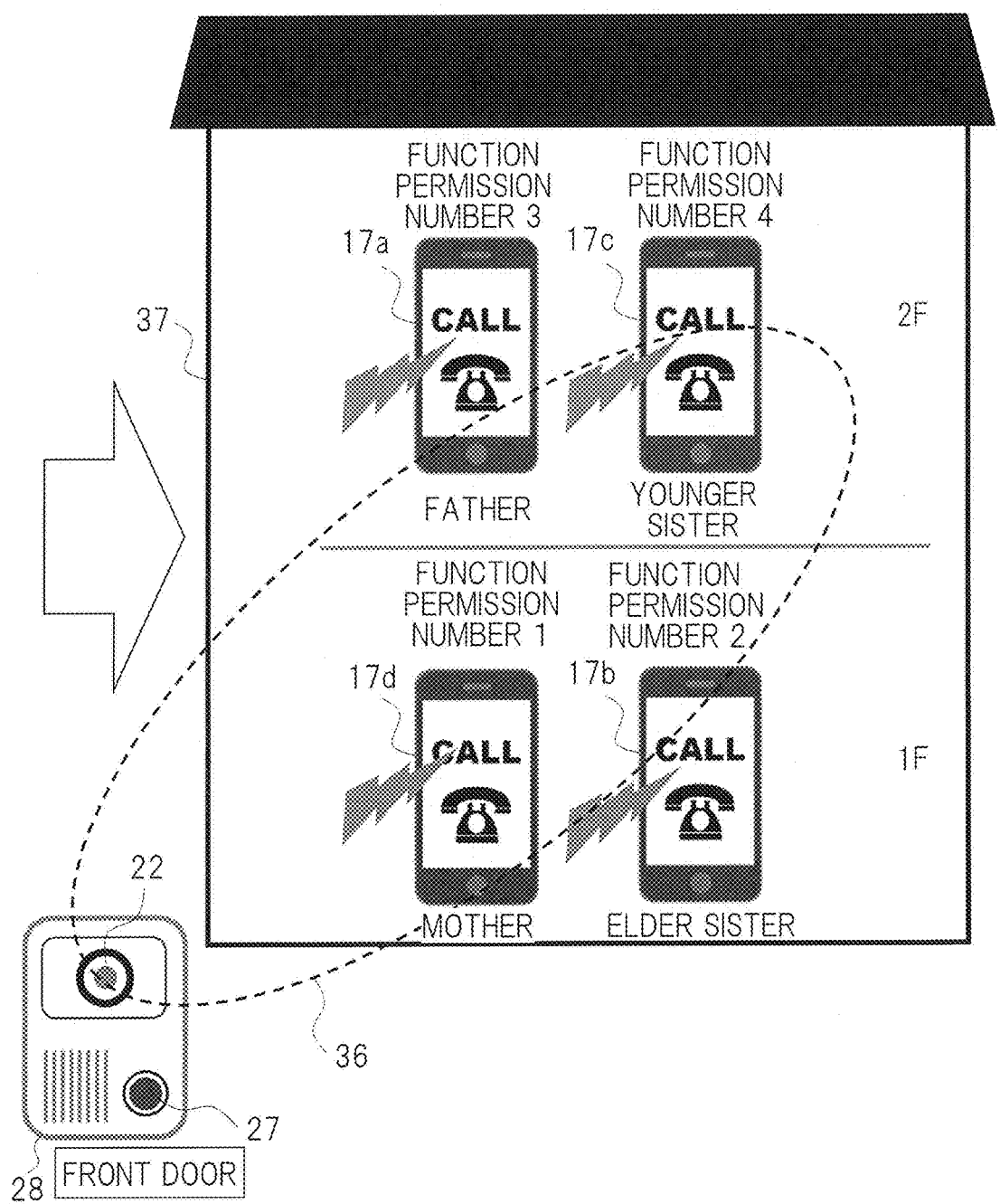
FIG. 4 is an explanatory drawing showing another example of FIG. 3.

In FIG. 3 and FIG. 4, for example, four the mobile terminals 17*a* to 17*d* are located in a house 37, and these mobile terminals 17*a* to 17*d* are respectively owned by a family. The house 37 is a detached house with two floors, for example.

Family members include a father, a mother, an elder sister, and a younger sister, for example. The mobile terminal 17*a* is owned by the father; the mobile terminal 17*b* is owned by the elder sister; the mobile terminal 17*c* is owned by the younger sister; and the mobile terminal 17*d* is owned by the mother. The intercom 28 is an intercom as described above, and is installed on the front door or the like.

In FIG. 3, as the positional relationship among the four mobile terminals 17*a* to 17*d* located in the house 37, the mobile terminal 17*a* of the father, the mobile terminal 17*b* of the elder sister, and the mobile terminal 17*c* of the younger sister are located on a second floor of the house 37, and the mobile terminal 17*d* of the mother is located on a first floor thereof.

In this case, the function permission number called from the intercom 28 are configured so as to set the function permission number for calling to higher in order from the mobile terminal located the nearest to the front door. Here, as the function permission numbers are configured so that the smaller a numeral value is, the higher a permissible range becomes, for example.

By calling the mobile terminal located the nearest to the intercom. 28 in this manner, it becomes possible to deal with a sudden visitor quickly.

Here, a rule in which a function permission number of a mobile terminal located at the nearest to the intercom 28 is set to higher is applied to the positional relationship of the mobile terminals 17*a* to 17*d* in the house 37 shown in FIG. 3. In descending order, the function permission number 1 is set to the mobile terminal 17*d*, a function permission number 2 is set to the mobile terminal 17*a*, a function permission number 3 is set to the mobile terminal 17*b*, and a function permission number 4, which is the lowest, is set to the mobile terminal 17*c*.

When a visitor pushes the switch 27 of the intercom 28, the intercom 28 first calls the mobile terminal 17*d* of the function permission number 1. When the visitor first pushes the switch 27 once or more, a calling operation to the mobile terminal 17*d* is repeatedly carried out.

For example, in a case where the mobile terminal 17*d* does not respond the calling three times, calling to the mobile terminal 17*a* with the function permission number 2 is subsequently started. In a case where the mobile terminal 17*a* does not also respond the calling three times, calling to the mobile terminal 17*b* with the function permission number 3 is started. For example, in a case where the mobile terminal 17*b* does not respond the calling three times, calling to the mobile terminal 17*c* with the function permission number 4 is finally started.

Subsequently, the case where the mobile terminal 17*b* moves from the second floor to the first floor in the house 37 as shown in FIG. 4 from the positional relationship shown in FIG. 3 will be described.

In a case where any of the mobile terminals 17*a* to 17*d* is moved in the house 37, reassignment of the function permission numbers to the mobile terminals 17*a* to 17*d* is carried out. Thus, when the mobile terminal 17*b* is moved to the first floor, the reassignment of the function permission numbers to the mobile terminals 17*a* to 17*d* is carried out.

The rule described above in which the function permission numbers are set in order from the mobile terminal the nearest to the intercom 28 is applied to the case of FIG. 4.

In descending order, the function permission number 1 is set to the mobile terminal 17d, the function permission number 2 is set to the mobile terminal 17b, the function permission number 3 is set to the mobile terminal 17a, and the function permission number 4 is set to the mobile terminal 17c. After the reassignment of the function permission numbers, an operation that the intercom 28 carries out calling according to the function permission numbers is also similar to that shown in FIG. 3.

Thus, it is possible to dynamically change the function permission numbers of the respective cellular phones in accordance with movement of any of the mobile terminals 17a to 17d in the house 37. Thus, the calling is always carried out in order from the mobile terminal the nearest to the intercom 28. Therefore, it is possible to carry out the calling efficiently.

Subsequently, a technique to detect a location of the mobile terminal 17 will be described.

A location of each of the mobile terminals 17a to 17d is recognized by a short-range wireless service area 36. This short-range wireless service area 36 is an area in which short-range wireless communication by the BLE transmitting unit 20 and the BLE receiving unit 5 (will be described later) can be carried out.

As has been explained in FIG. 2, the intercom 28 has the wireless LAN 19 that exchanges audio signals and video signals through wireless communication, and the BLE transmitting unit 20 that carries out short-range wireless communication.

Further, the mobile terminal 17 shown in FIG. 1 also has the wireless LAN 4 that communicates with the wireless LAN 19 by wireless, and the BLE receiving unit 5 that receives a transmission signal transmitted by the BLE transmitting unit 20.

Both of these are the wireless communication technology. However, in case of the wireless LAN 4 and the wireless LAN 19, each of them has electric field intensity that completely includes an area in the house 37 of FIG. 3. On the other hand, the BLE transmitting unit 20 is a wireless communication technology for a short range, for example, and transmits an electric wave with low electric field intensity such as Bluetooth.

By transmitting an electric wave with low electric field intensity such as Bluetooth in this manner, an electric field network for specifying a narrow area in the house 37, that is, the short-range wireless service area 36 described above is established in the house 37.

When the BLE receiving unit 5 of the mobile terminal 17 receives a Bluetooth radio wave with low electric field intensity such as Bluetooth, for example, which is transmitted from the BLE transmitting unit 20 of the intercom 28, the CPU 11 measures receiving intensity thereof, that is, electric field intensity thereof.

The measured receiving intensity is transmitted to the intercom 28 via the wireless LAN 4 and the wireless LAN 19. The CPU 24 of the intercom 28 detects a distance from the intercom 28 in accordance with the received receiving intensity.

<Example of Setting Process for Function Permission Number>

Hereinafter, a process that realizes the operation explained by using FIG. 3 and FIG. 4 will be described with reference to FIG. 5 and FIG. 6.

Figure 5:
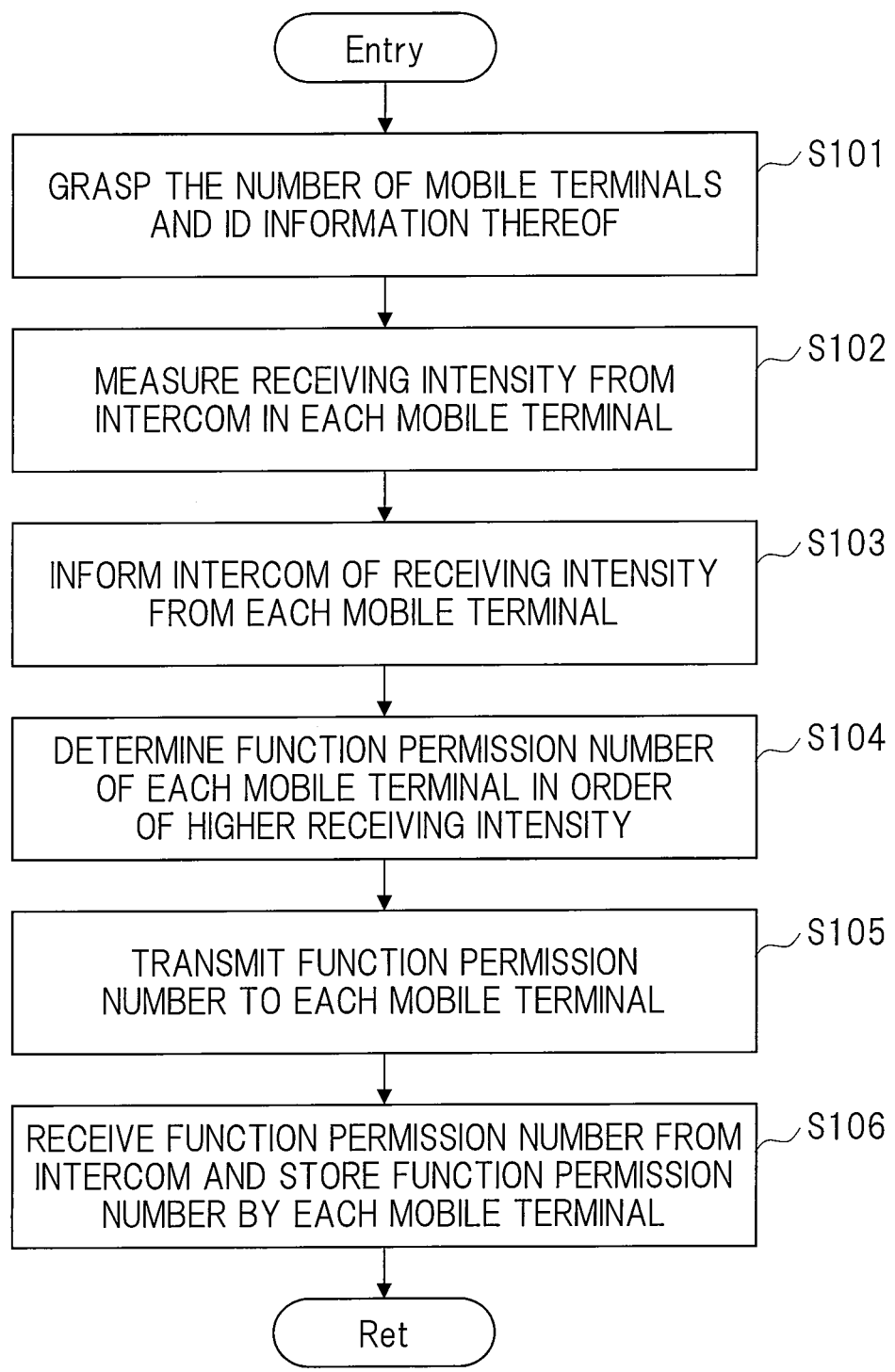
FIG. 5 is a flowchart showing one example of a process to set function permission numbers by the mobile terminal shown in FIG. 1 and the intercom shown in FIG. 2.
Figure 6:
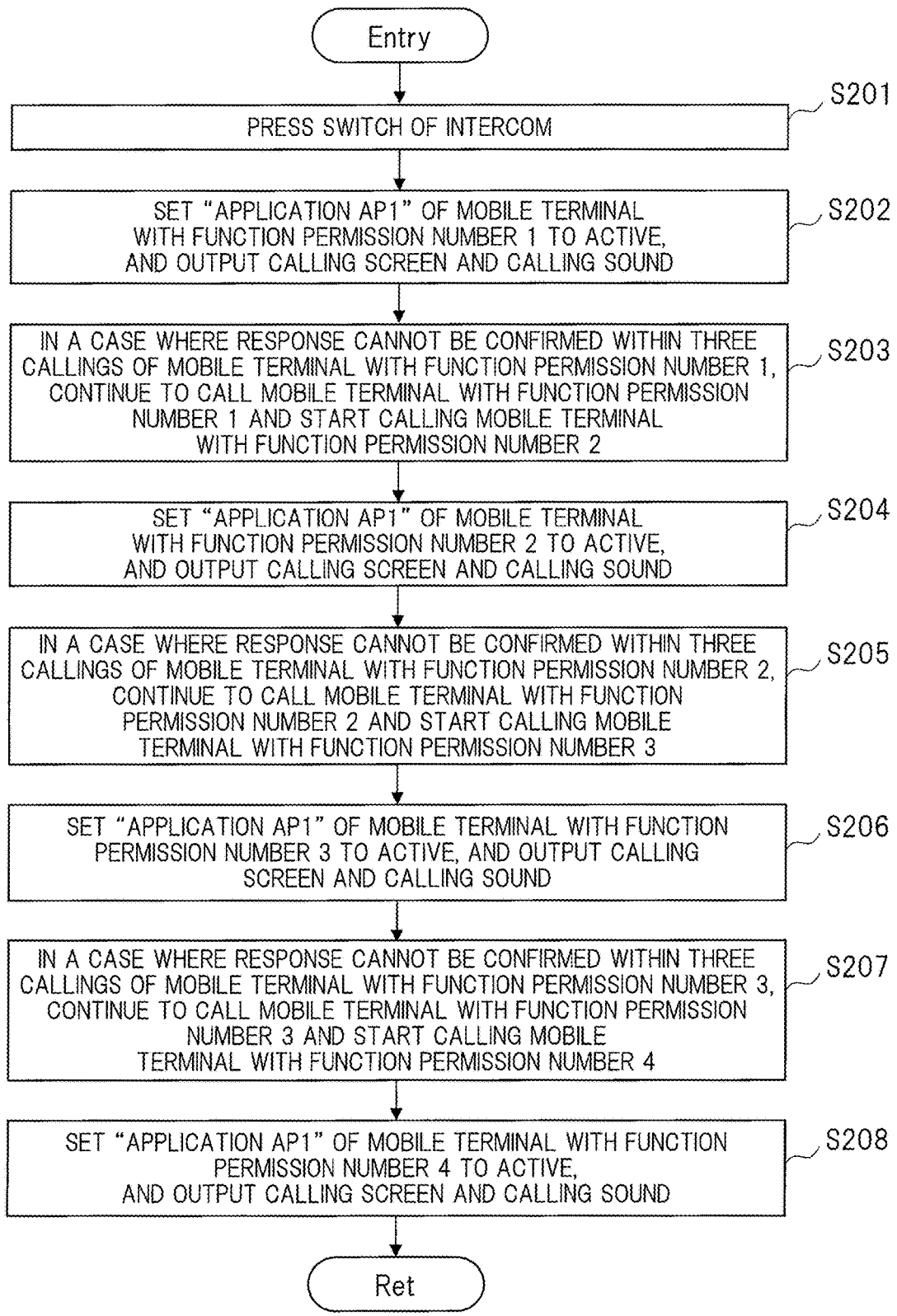
FIG. 6 is a flowchart showing one example of a calling process by the mobile terminal shown in FIG. 1 and the intercom shown in FIG. 2.

FIG. 5 is a flowchart showing one example of a process to set function permission numbers by the mobile terminal 17 shown in FIG. 1 and the intercom 28 shown in FIG. 2. FIG. 6 is a flowchart showing one example of a calling process by the mobile terminal 17 shown in FIG. 1 and the intercom 28 shown in FIG. 2.

An assigning process for function permission numbers to the respective mobile terminals 17 will first be described. In FIG. 5, a processing entity in the intercom 28 side is the CPU 24, and a processing entity in the mobile terminal 17 side is the CPU 11.

In FIG. 5, through wireless LAN communication, the intercom 28 first obtains the number of mobile terminals to each of which Wi-Fi wireless connection is established and ID information of each of the mobile terminals (Step S101).

The ID information of each of the mobile terminals is a MAC (Media Access Control) address or the like, for example. The MAC address is an identification number that is assigned to each of network connecting devices, that is, the mobile terminals.

Subsequently, each of the mobile terminals 17a to 17d, which are connected to the intercom 28 via Wi-Fi communication, receives a short-range wireless wave transmitted from the intercom 28, that is, the Bluetooth radio wave, and measures receiving intensity thereof (Step S102).

Each of the mobile terminals 17a to 17d informs the intercom 28 of a value of the receiving intensity of the Bluetooth radio wave, which was measured using the Wi-Fi communication (Step S103). The intercom 28 determines respective function permission numbers for the mobile terminals 17a to 17d in the order of higher values of the receiving intensity on the basis of the values of the receiving intensity respectively informed from the mobile terminals 17a to 17d (Step S104). This determination of the function permission numbers is carried out by the function permission number control unit 25 shown in FIG. 2.

When the function permission numbers of the mobile terminals 17a to 17d are respectively determined by the process at Step S104, the intercom 28 respectively transmits the determined function permission numbers to the mobile terminals 17a to 17d via the Wi-Fi communication by using MAC addresses that are ID information of the mobile terminals 17a to 17d as indices (Step S105).

Each of the mobile terminals 17a to 17d receives the corresponding function permission number transmitted by the wireless LAN 4 shown in FIG. 1 via the Wi-Fi communication. The function permission number changing unit 1 shown in FIG. 1 recognizes the received function permission number corresponding to the MAC address, and the function permission number is stored in the function permission number storing unit 2 shown in FIG. 1 (Step S106).

By the processes described above, the function permission numbers are set in order from the mobile terminal the nearest to the intercom 28. This makes it possible to dynamically change the function permission numbers so that the function permission number of the mobile terminal near the intercom 28 becomes higher.

<Example of Calling Process>

Next, the calling process for the mobile terminals 17a to 17d to which the function permission numbers are respectively set from the intercom 28 will be described with reference to the flowchart shown in FIG. 6.

When a visitor or the like first operates the switch 27 shown in FIG. 2, which is a calling switch of the intercom 28 (Step S201), the intercom 28 transmits calling information, which informs that the visitor operates the switch 27, to the mobile terminals 17a to 17d from the wireless LAN 19. This calling information becomes cooperation information.

Information for calling the mobile terminal with the function permission number 1 as described above is superimposed on this calling information. Namely, in case of calling the mobile terminal with the function permission number 1, the function permission number 1 is superimposed on the calling information. The function permission number 1 superimposed on this calling information becomes the first function permission information.

Each of the mobile terminals 17a to 17d, which receives the calling information, confirms the function permission number stored in the function permission number storing unit 2. Then, when it is recognized that the function permission number of the mobile terminal to which the function permission number 1 is set, that is, the mobile terminal 17d in FIG. 3 is 1, the application AP1 having a function to become the slave unit of the intercom is set to active. This causes the display unit 16 of the mobile terminal 17d to display a calling screen from the intercom 28 thereon, and causes the speaker 13 to output a calling sound therefrom (Step S202).

Then, in a case where there is no response by the mobile terminal 17d with the function permission number 1, the intercom 28 transmits the calling information to the mobile terminal 17a shown in FIG. 3, which is the mobile terminal with the function permission number 2, while continuing the calling operation to the mobile terminal 17d with the function permission number 1 (Step S203).

In a case where the calling is carried out three times and there is no response therefrom, it is determined that there is no response by the mobile terminal 17d with the function permission number 1, for example. Hereinafter, in each of the mobile terminals 17a to 17c, for example, it is determined that there is no response in a case where the calling is carried out three times and there is no response therefrom. In this regard, this number of times of the response is arbitrary.

Each of the mobile terminals 17a to 17c, which receives the calling information, confirms the function permission number stored in the function permission number storing unit 2 thereof. When the mobile terminal 17a to which the function permission number 2 is set recognizes that the function permission number thereof is 2, the application AP1 is set to active.

This causes the display unit 16 of the mobile terminal 17a to display a calling screen from the intercom 28 thereon, and causes the speaker 13 to output a calling sound therefrom (Step S204).

Further, in a case where the response from the mobile terminal 17a with the function permission number 2 can be confirmed, the intercom. 28 transmits the calling information to the mobile terminal 17b shown in FIG. 3, which is the mobile terminal with the function permission number 3, while continuing the calling operation to the mobile terminal 17d with the function permission number 1 and the calling operation to the mobile terminal 17a with the function permission number 2 (Step S205).

Each of the mobile terminals 17c, 17d, which receives the calling information, confirms the function permission number stored in the function permission number storing unit 2 thereof. When the mobile terminal 17b to which the function permission number 3 is set recognizes that the function permission number thereof is 3, the application AP1 is set to active.

This causes the display unit 16 of the mobile terminal 17b to display a calling screen from the intercom 28 thereon, and causes the speaker 13 to output a calling sound therefrom (Step S206).

Similarly, in a case where the response of the mobile terminal 17b with the function permission number 3 cannot be confirmed, the intercom. 28 transmits the calling information to the mobile terminal 17c shown in FIG. 3, which is the mobile terminal with the function permission number 4, while continuing the calling operation to each of the mobile terminals 17d, 17a, 17b (Step S207).

The mobile terminal 17c that receives the calling information confirms the function permission number stored in the function permission number storing unit 2 thereof. When the mobile terminal 17c to which the function permission number 4 is set recognizes that the function permission number thereof is 4, the application AP1 is set to active. This causes the display unit 16 of the mobile terminal 17c to display a calling screen from the intercom 28 thereon, and causes the speaker 13 to output a calling sound therefrom (Step S208).

This causes the calling process to the mobile terminals 17a to 17d to be terminated.

As described above, it is possible to preferentially carry out calling to the mobile terminal the nearest to the intercom 28. This makes it possible to deal with the calling in order from the mobile terminal the nearest to the front door. Therefore, it becomes possible to deal with a sudden visitor quickly.

Further, since the function permission numbers can be dynamically changed in accordance with movement of any of the mobile terminals, it is possible to always carry out the calling in order from the mobile terminal the nearest to the intercom 28. Therefore, even in a case where the mobile terminal moves in the house 37, it is possible to deal with a visitor efficiently.

Second Embodiment

<Outline>

In the first embodiment, the technique to determine a distance from the intercom 28 to each of the mobile terminals by using receiving intensity of a Bluetooth radio wave as an index has been explained as an index to determine the function permission numbers of the mobile terminals. In a second embodiment, a technique to set a function permission number of a mobile terminal that is located in a specific room to be higher will be described.

<Configuration Example of Target Operation Device Communication System>

In this second embodiment, a configuration of a target operation device communicating system is a configuration in which a location specifying unit 40 shown in FIG. 8 and FIG. 9 (will be described later) is newly provided in the system including the mobile terminals 17 shown in FIG. 1 and the intercom 28 shown in FIG. 2. Since a configuration of each of the mobile terminals 17 is similar to that shown in FIG. 1 according to the first embodiment, its explanation is omitted.

<Configuration Example of Intercom>

Figure 7:
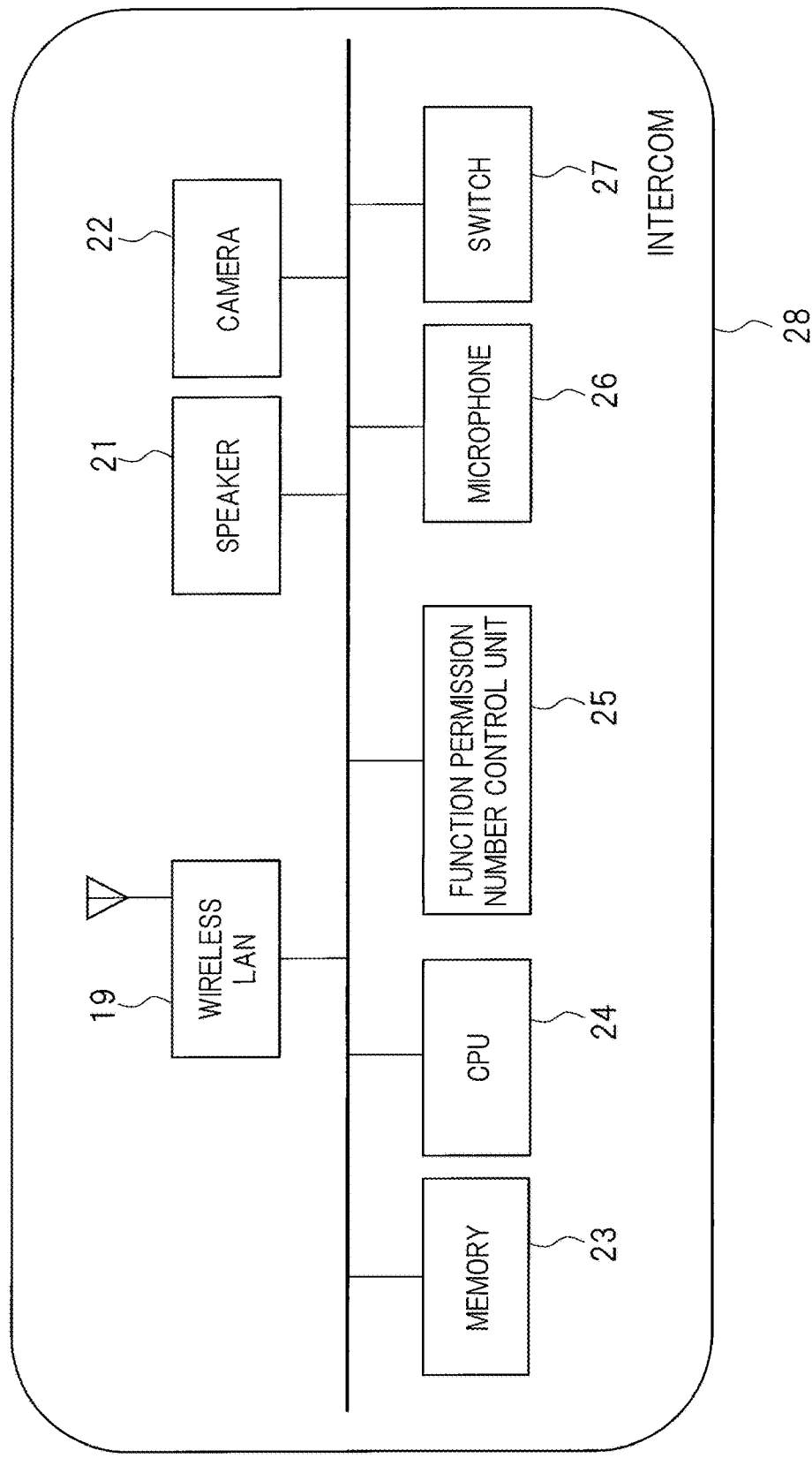
FIG. 7 is an explanatory drawing showing one example of a configuration of an intercom according to a second embodiment.

FIG. 7 is an explanatory drawing showing one example of a configuration of the intercom 28 according to the second embodiment.

A difference between the intercom 28 shown in FIG. 7 and the intercom 28 shown in FIG. 2 according to the first embodiment is that there is no BLE transmitting unit 20, which the intercom 28 shown in FIG. 2 includes. Since the other configuration is similar to that shown in FIG. 2 according to the first embodiment, its explanation is omitted.

The location specifying unit 40 is a unit that generates a radio wave for specifying a short-range wireless service area 36. The short-range wireless service area 36 becomes a narrow area in a house 37 from several meters to about dozens of meters, for example. This radio wave is an electric wave with low electric field intensity, such as Bluetooth, transmitted from a BLE transmitting unit 41.

The location specifying unit 40 is installed on a first floor of the house 37, for example. Then, by detecting the radio wave generated by the location specifying unit 40, it is recognized that a mobile terminal side is located on the first floor.

<Setting and Reading Operations of Function Permission Numbers of Mobile Terminals>

Figure 8:
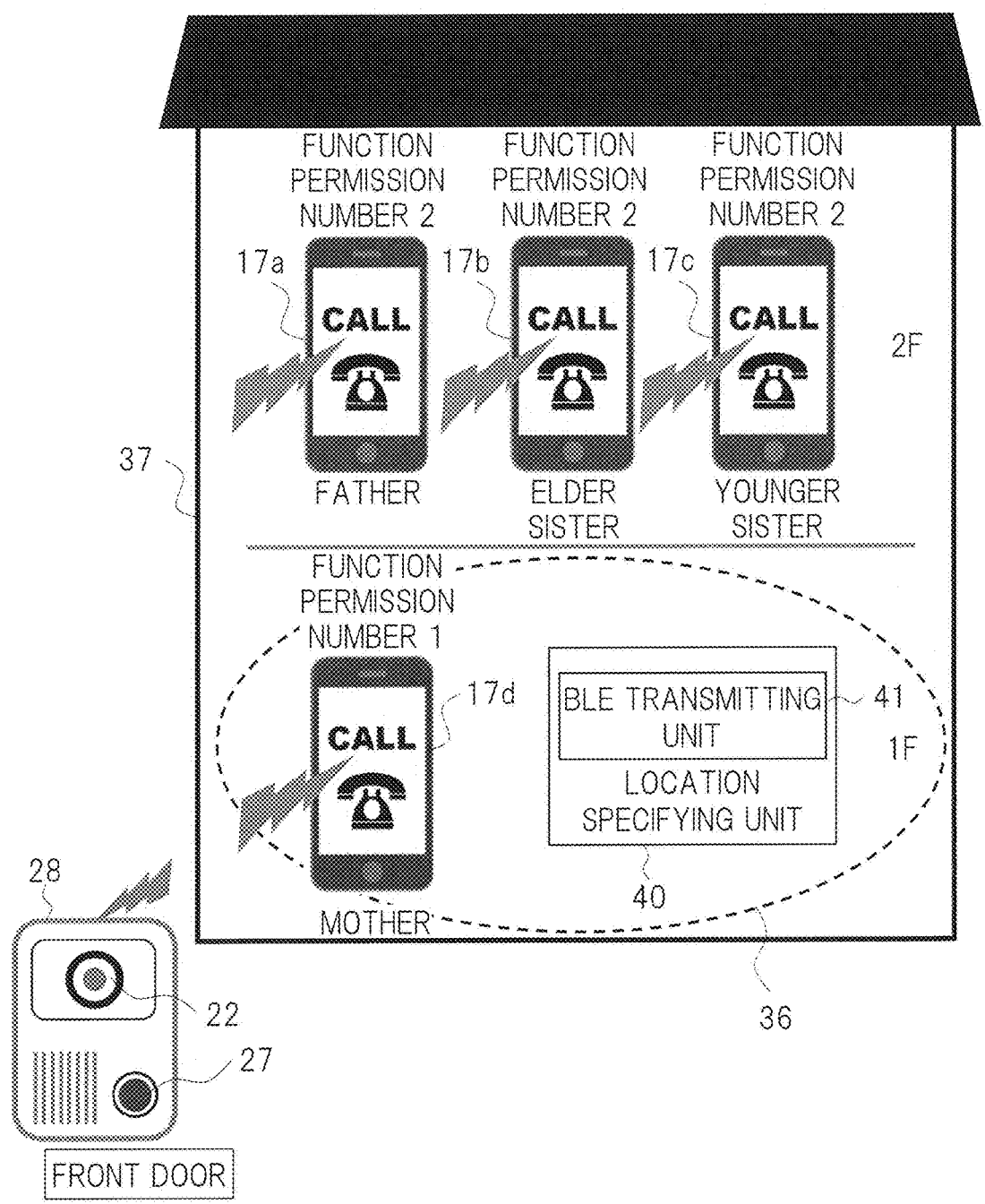
FIG. 8 is an explanatory drawing showing one example of a positional relationship among the intercom and a plurality of mobile terminals.

FIG. 8 is an explanatory drawing showing one example of a positional relationship among the intercom 28 and the plurality of mobile terminals 17. Further, FIG. 9 is an explanatory drawing showing another example of FIG. 8.

Figure 9:
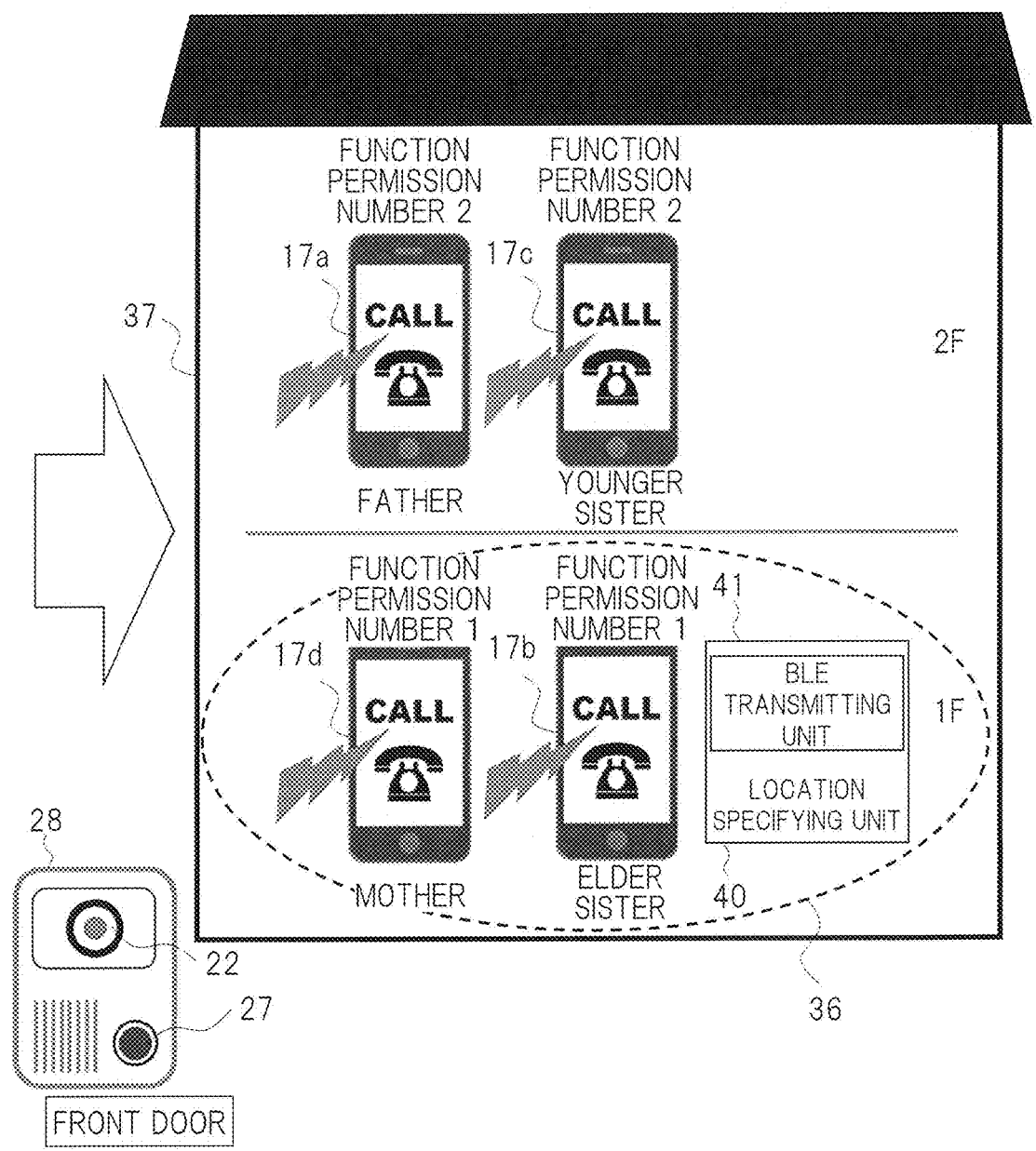
FIG. 9 is an explanatory drawing another example of FIG. 8.

As well as FIG. 3 and FIG. 4 according to the first embodiment, in FIG. 8 and FIG. 9, four mobile terminals 17a to 17d are located in the house 37, and these mobile terminals 17a to 17d are respectively owned by a family. The house 37 is a detached house with two floors, for example.

Further, the mobile terminal 17a is owned by a father, the mobile terminal 17b is owned by an elder sister, the mobile terminal 17c is owned by a younger sister, and the mobile terminal 17d is owned by a mother. The intercom 28 is an intercom as described above, and is installed on a front door or the like.

Here, in an assigning process of function permission numbers and a calling process, which will be described below, processes of respective functions are also executed on the basis of software of a program form, which is stored in a program storing memory or the like (not shown in the drawings) that is provided in each of the mobile terminal 17 and the intercom 28.

These kinds of software are respectively executed by a CPU 11 of the mobile terminal 17 and a CPU 24 of the intercom 28. Further, the software for executing the functions described above may be downloaded via a communication line such as the Internet. Alternatively, it may be configured so that these types of software are respectively installed in advance in the mobile terminal 17 and the intercom 28.

In FIG. 8, as a positional relationship the four mobile terminals 17a to 17d located in the house 37, the mobile terminal 17a of the father, the mobile terminal 17b of the elder sister, and the mobile terminal 17c of the younger sister are located on a second floor of the house 37, and the mobile terminal 17d of the mother is located on the first floor.

At this time, as the function permission numbers for determining an order to be called from the intercom 28, a function permission number of the mobile terminal located on the first floor is set to higher, and those of the mobile terminals located on the second floor are set to next function permission number in the same line. By setting them in this manner, the mobile terminal located on the first floor and the nearest to the front door is first called. Therefore, it is possible to deal with a sudden visitor quickly.

When the setting rule for the function permission numbers described above is applied to the positional relationship shown in FIG. 8, a function permission number 1 is set to the mobile terminal 17d located on the first floor, and a function permission number 2 is set to each of the mobile terminals 17a, 17b, 17c located on the second floor.

When a visitor pushes a switch 27 of the intercom 28, the intercom 28 first calls the mobile terminal 17d with the function permission number 1. At this time, the visitor pushes the switch once or more, whereby repeat calling to the mobile terminal 17d is carried out.

In a case where the mobile terminal 17d does not respond the calling three times, the intercom 28 starts calling to the mobile terminals with the function permission number 2, that is, the mobile terminals 17a, 17b, 17c.

Further, in a case where any mobile terminal is moved from the first floor to the second floor or from the second floor to the first floor in a state where the function permission numbers are set to the four the mobile terminals 17a to 17d, reassignment of the function permission numbers to the mobile terminals 17a to 17d is carried out.

FIG. 9 shows the case where the mobile terminal 17d for the elder sister is moved to the first floor in a state where the function permission numbers are respectively set to the four mobile terminals 17a to 17d shown in FIG. 8.

When the rule described above to set the function permission numbers so that a permissible range of the mobile terminal located on the first floor of the house 37 becomes higher is applied, as shown in FIG. 9, the function permission number 1 is set to each of the mobile terminals 17d, 17b, and the function permission number 2 is set to each of the mobile terminals 17a, 17c.

After the reassignment of the function permission numbers, a calling operation according to the function permission numbers from the intercom 28 is the similar operation according to the first embodiment, and explanation for the calling operation is omitted herein.

Thus, when any of the mobile terminals 17a to 17d is moved to a specific area in the house 37, it is possible to dynamically change the function permission number. This makes it possible to always carry out the calling to each of the mobile terminals 17a to 17d from the intercom 28 efficiently. In this regard, the specific area is the short-range wireless service area 36 in which the location specifying unit 40 is installed, and is the first floor in FIG. 8 and FIG. 9.

<Example of Setting Process for Function Permission Number>

Figure 10:
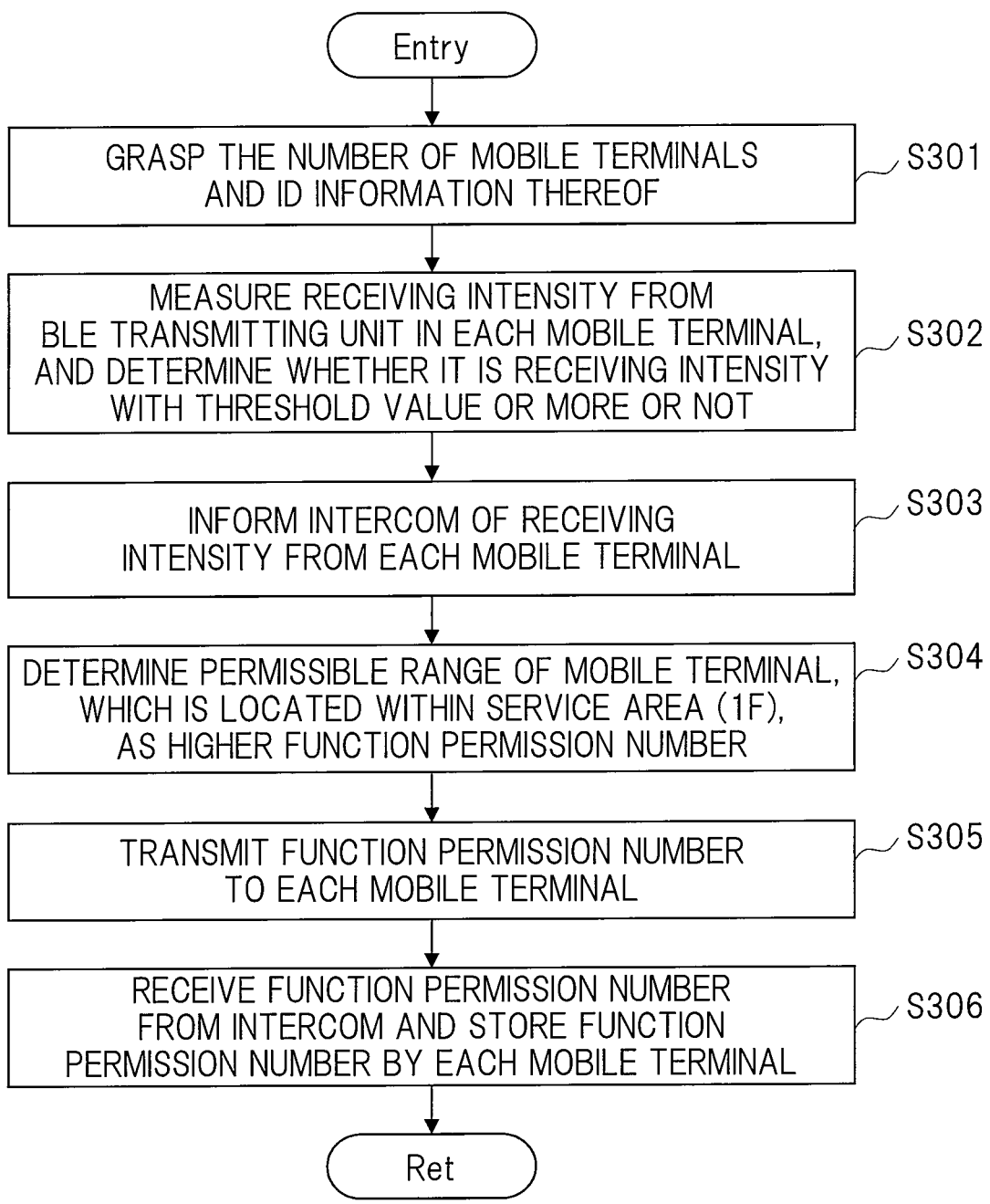
FIG. 10 is a flowchart showing one example of a setting process of a function permission number by a target operation device communicating system provided with a location specifying unit.

FIG. 10 is a flowchart showing one example of a setting process of a function permission number by the target operation device communicating system provided with the location specifying unit 40.

The intercom 28 first obtains, by wireless LAN communication, the number of mobile terminals to each of which Wi-Fi wireless connection is established and ID information of each of the mobile terminals (Step S301). The ID information of each of the mobile terminals is a MAC (Media Access Control) address or the like, for example.

Subsequently, each of the mobile terminals 17a to 17d determines the corresponding receiving intensity (Step S302). In this process at Step S302, each mobile terminal receives the Bluetooth radio wave transmitted from the BLE transmitting unit 41 of the location specifying unit 40, and the CPU 11 measures receiving intensity thereof.

The CPU 11 then determines whether the measured receiving intensity is a threshold value set in advance or more or not. In a case where the receiving intensity is the threshold value or more, it is determined that it is located in the short-range wireless service area 36, that is, located on the first floor of the house 37. Further, in a case where the receiving intensity falls below the threshold value, it is determined that it is located outside a range of the short-range wireless service area 36, that is, located on the second floor of the house 37.

Then, each of the mobile terminals 17a to 17d carries out Wi-Fi communication with the intercom 28 to inform information on whether its own mobile terminal is located on the first floor of the house 37 or not (Step S303).

On the basis of the information informed from each of the mobile terminals 17a to 17d, the function permission number control unit 25 of the intercom. 28 shown in FIG. 2 preferentially sets the function permission number 1 to the mobile terminal located in the short-range wireless service area 36, that is, located on the first floor of the house 37 (Step S304).

When the function permission numbers of all the mobile terminals 17a to 17d are determined, the intercom 28 transmits the determined function permission number to each of the mobile terminals 17a to 17d via the Wi-Fi communication by using a MAC address, which is ID information of each of the mobile terminals 17a to 17d, as an index (Step S305).

Each of the mobile terminals 17a to 17d receives the corresponding function permission number transmitted by the wireless LAN 4 of FIG. 1 via the Wi-Fi communication. The function permission number changing unit 1 of FIG. 1 recognizes a function permission number corresponding to the received MAC address, and the function permission number is stored in the function permission number storing unit 2 of FIG. 1 (Step S306).

The processes described above allow the function permission numbers to be set so as to preferentially call the mobile terminal 17 that is located on the first floor of the house 37.

<Example of Calling Process>

Next, a calling process from the intercom 28 to the mobile terminals 17a to 17d to which the function permission numbers are respectively set will be described by using a flowchart of FIG. 11.

Figure 11:
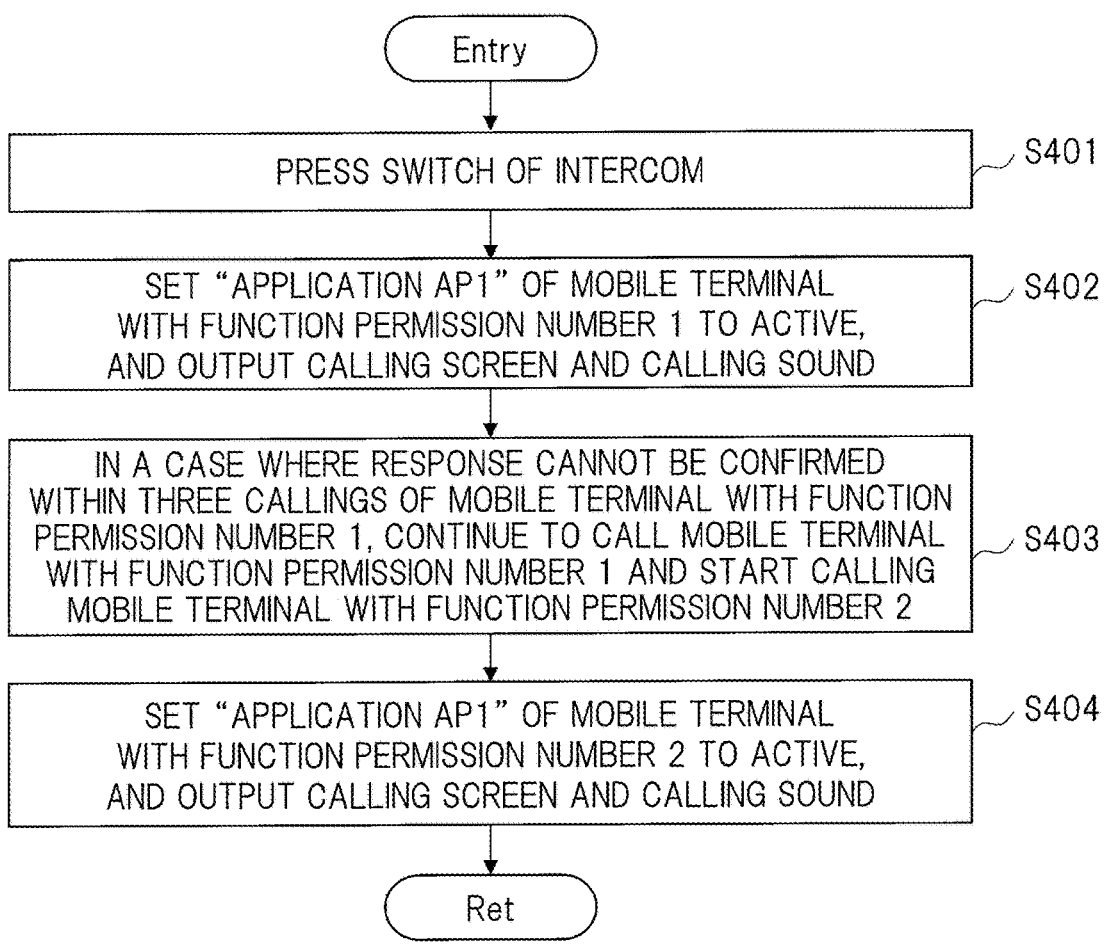
FIG. 11 is a flowchart showing one example of a calling process of a mobile terminal that is set by the setting process of the function permission number shown in FIG. 10.

FIG. 11 is a flowchart showing one example of the calling process to the mobile terminals that are set by the setting process for the function permission numbers shown in FIG. 10.

When a visitor or the like first operates the switch 27 of FIG. 7, which is a calling switch of the intercom 28 (Step S401), the intercom 28 transmits, from a wireless LAN 19, calling information for informing each of the mobile terminals 17a to 17d that the visitor operates the switch 27.

When each of the mobile terminals 17a to 17d receives the calling information on which information for calling the mobile terminal with the function permission number 1 is superimposed, it confirms the function permission number stored in the corresponding function permission number storing unit 2.

Then, when the mobile terminal to which the function permission number 1 is set, that is, the mobile terminal 17d in FIG. 8 recognizes that the function permission number thereof is 1, an application AP1 having a function to become a slave unit of the intercom is set to active. This causes the display unit 16 of the mobile terminal 17d to display a calling screen from the intercom 28 thereon, and causes the speaker 13 to output a calling sound therefrom (Step S402).

In a case where there is no response by the mobile terminal 17d with the function permission number 1, the intercom 28 transmits the calling information to the mobile terminals 17a, 17b, 17c of FIG. 3, each of which is the mobile terminal with the function permission number 2, while continuing the calling operation to the mobile terminal 17d with the function permission number 1 (Step S403). Here, the calling to the mobile terminal 17d with the function permission number 1 is also carried out three times, for example.

Each of the mobile terminals 17a to 17c that receive the calling information confirms the function permission number stored in the function permission number storing unit 2.

In FIG. 8, the function permission number 2 is set to each of the mobile terminals 17a to 17c located on the second floor. Therefore, when each of these mobile terminals 17a to 17c recognizes that the function permission number is 2, the application AP1 thereof is set to active.

This causes the display unit 16 of each of the mobile terminals 17a to 17c to display a calling screen from the intercom 28 thereon, and causes the speaker 13 to output a calling sound therefrom (Step S404).

This causes the calling process to the mobile terminals 17a to 17d to be terminated.

As described above, it is possible to preferentially carry out calling to the mobile terminal the nearest to the intercom 28. This makes it possible to deal with the calling in order from the mobile terminal the nearest to the front door. Therefore, it becomes possible to deal with a sudden visitor quickly.

The location specifying unit 40 installed on the first floor of the house 37 always outputs the Bluetooth radio wave from the BLE transmitting unit 41, and all the mobile terminals in the house 37 always receives the Bluetooth radio wave. Therefore, in a case where movement of any mobile terminal occurs, that is, when the mobile terminal is moved from the first floor to the second floor of the house 37 or from the second floor to the first floor, the mobile terminal transmits, to the intercom 28, the movement of the mobile terminal via the Wi-Fi communication.

Determination of whether to move from the first floor to the second floor or from the second floor to the first floor is carried out, in the similar manner to the process at Step S302 of FIG. 10, on the basis of whether receiving intensity of the Bluetooth radio wave is the threshold value or not or falls below the threshold value or not.

The intercom 28 again carries out the assigning process of the function permission numbers as a trigger that the mobile terminal informs to move. Since this reassigning process of the function permission numbers is similar to the process shown in FIG. 10, its explanation is omitted.

As described above, by installing the location specifying unit 40 at an arbitrary location in the house 37, the intercom 28 can always recognize the mobile terminal that is located at the arbitrary location. This makes it possible to preferentially call to the mobile terminal that is located at the arbitrary location. Therefore, it becomes possible to deal with a sudden visitor quickly.

Here, it is effective for the arbitrary location to be set to a location near an installation location of the intercom 28 such as the first floor of the house 37, for example. It is possible to carry out a speedy response by preferentially calling the mobile terminal located at the location near the installation location of the intercom 28.

Third Embodiment

<Outline>

In the first and second embodiments, the technique to change the permissible ranges of the mobile terminals dynamically and real time in accordance with the locations of the mobile terminals in the house has been described. In a third embodiment, a technique to determine function permission numbers of mobile terminals by using information, in which a requirement for users of the mobile terminals such as children or adults and a requirement of location of the mobile terminals in a house, for example, are combined, as an index will be described.

A visitor is not necessarily limited to a secure visitor such as an acquaintance, a friend, a home-delivery person, or a postman. For example, there is a possibility that he or she is a dangerous visitor such as a salesman of goods or a pushy salesman. Further, a visitor is often related to a mother and/or a father of a family.

In view of these backgrounds to use an intercom, function permission numbers as slave unit applications of the intercom are set to mobile terminals by using specific information of the mobile terminals, that is, an owner thereof to determine permissible ranges thereof as a parameter. Thus, it is possible to improve utilization of the intercom with safe and secure and conveniently.

<Example of Setting of Function Permission Numbers by Specific Information>

Hereinafter, a technique to set specific information of a mobile terminal as a parameter in setting of function permission numbers will be described with reference to FIG. 12 to FIG. 15.

Here, in an assigning process of function permission numbers, which will be described below, processes of respective functions are executed on the basis of software of a program form, which is stored in a program storing memory or the like (not shown in the drawings) that is provided in each of a mobile terminal 17 and an intercom.

These types of software are respectively executed by a CPU 11 of the mobile terminal 17 and a CPU 24 of an intercom 28. Further, the software for executing the functions described above may be downloaded via a communication line such as the Internet. Alternatively, it may be configured so that these types of software are respectively installed in advance in the mobile terminal 17 and the intercom 28.

Since a configuration of a target operation device communicating system according to the third embodiment is similar to that shown in FIG. 8 according to the second embodiment, its explanation is omitted. Further, a configuration of the mobile terminal 17 is similar to that shown in FIG. 1 according to the first embodiment, and a configuration of the intercom. 28 is similar to that shown in FIG. 7 according to the second embodiment.

Figure 12:
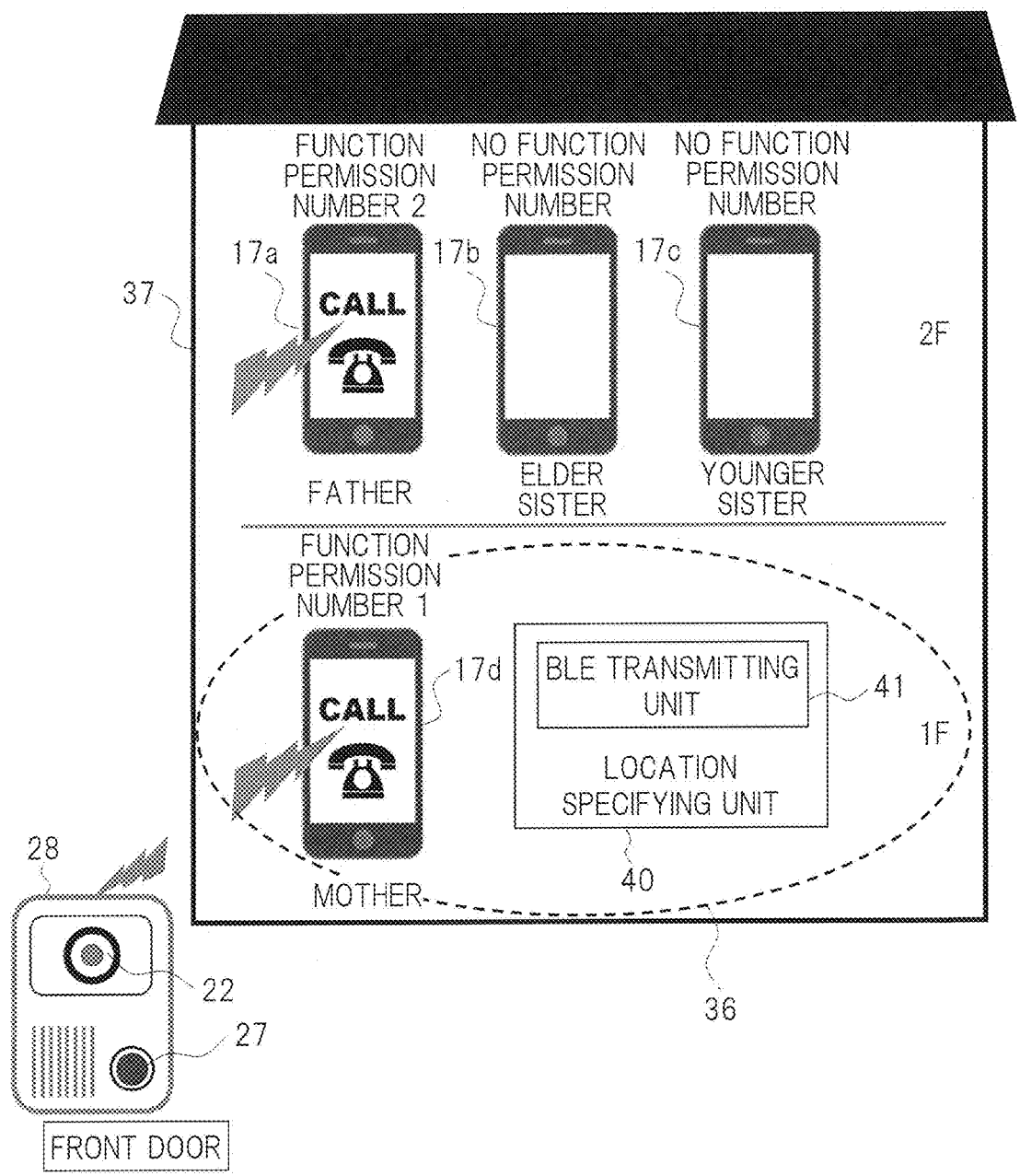
FIG. 12 is an explanatory drawing showing one example of a positional relationship among an intercom and a plurality of mobile terminals according to a third embodiment.

FIG. 12 is an explanatory drawing showing one example of a positional relationship among the intercom 28 and a plurality of mobile terminals 17 according to the third embodiment. Further, FIG. 13 is an explanatory drawing showing another example of FIG. 9.

Figure 13:
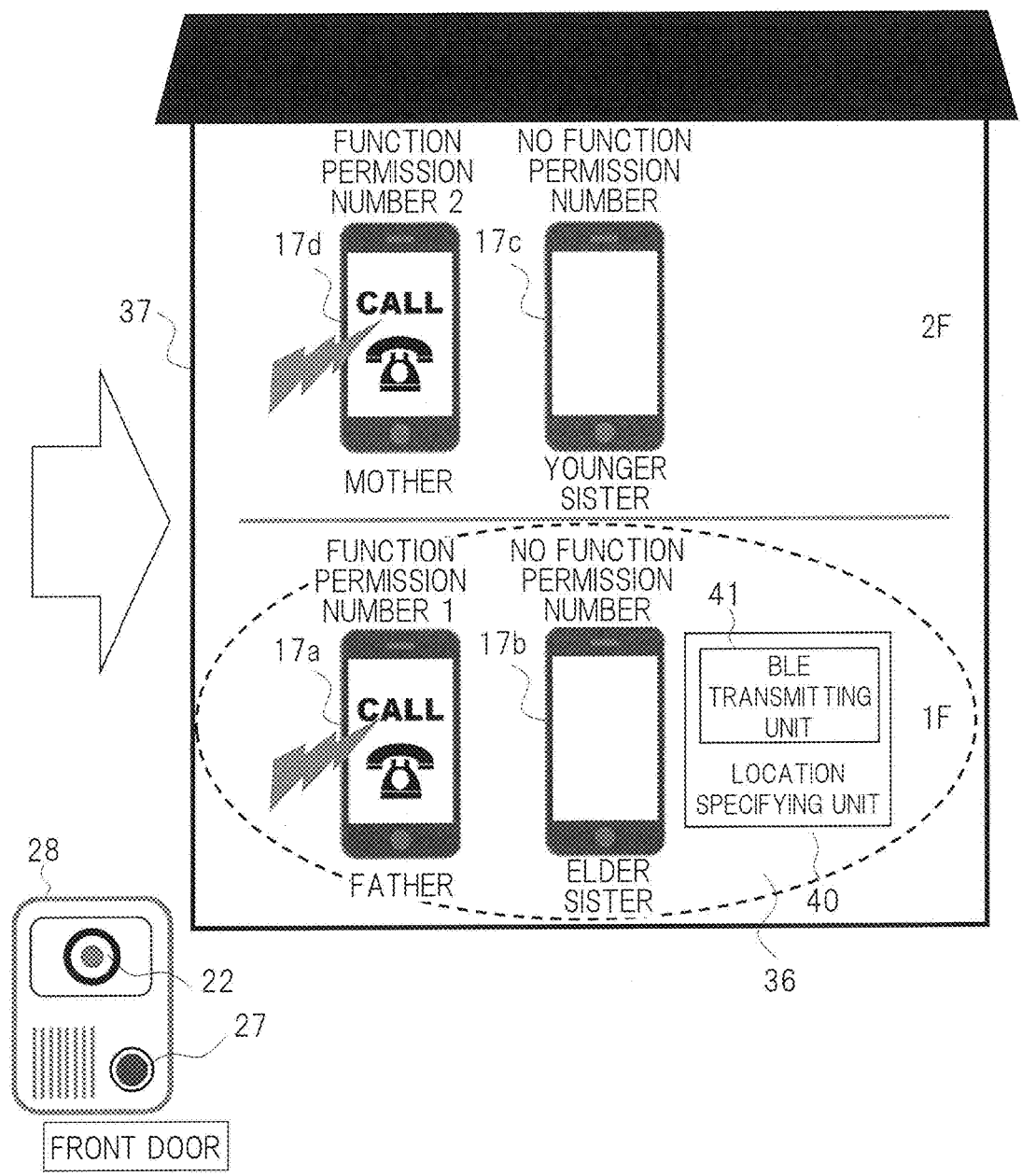
FIG. 13 is an explanatory drawing showing another example of FIG. 9.

As well as FIG. 8 and FIG. 9 according to the second embodiment, in FIG. 12 and FIG. 13, four mobile terminals 17a to 17d are located in a house 37, and these mobile terminals 17a to 17d are respectively owned by a family. The house 37 is a detached house with two floors, for example.

Further, the mobile terminal 17a is owned by a father, the mobile terminal 17b is owned by an elder sister, the mobile terminal 17c is owned by a younger sister, and the mobile terminal 17d is owned by a mother. The intercom 28 is an intercom as described above, and is installed on a front door or the like.

In FIG. 12, as a positional relationship the four mobile terminals 17a to 17d located in the house 37, the mobile terminal 17a of the father, the mobile terminal 17b of the elder sister, and the mobile terminal 17c of the younger sister are located on a second floor of the house 37, and the mobile terminal 17d of the mother is located on a first floor.

In case of the third embodiment, as the function permission numbers to be called from the intercom 28, in addition to the rule in which the function permission numbers for calling are set to be higher in order from a mobile terminal located on the first floor, function permission numbers of the mobile terminal 17b and the mobile terminal 17c are set to be lower, or set so as not to give a right for calling and reception as a slave unit terminal of the intercom 28. By setting them in this manner, it is possible to protect the safety of children from an unexpected visitor, a salesman, a pushy salesman, and a suspicious person.

Here, a rule in which the right to function as the slave unit of the intercom 28 is not given to the mobile terminals of the children (including the elder sister and the younger sister) while setting the function permission number of the mobile terminal located on the first floor of the house 37 to be higher is applied to the positional relationship of FIG. 12.

In this case, as shown in FIG. 12, the function permission number 1 is set to the mobile terminal 17d of the mother, which is located on the first floor, and the function permission number 2 is set to the mobile terminal 17a of the father, which is located on the second floor. Further, no function permission number is set to the mobile terminal 17b of the elder sister and the mobile terminal 17c of the younger sister.

Specific information on the mobile terminal is stored in the ID number storing unit 3 in the mobile terminal 17 shown in FIG. 1. As correspondence of the users of the mobile terminals, a user inputs, from the input unit 15, information of an attribute of the user, for example, whether the user is an adult or a child. This attribute is stored in the ID number storing unit 3 as the specific information.

When a visitor pushes a switch 27 of the intercom 28, the intercom 28 first calls the mobile terminal 17d with the function permission number 1. At this time, the visitor pushes the switch 27 once or more, whereby the intercom 28 carries out repeat calling to the mobile terminal 17d.

In a case where the mobile terminal 17d does not respond the calling three times, the intercom 28 starts calling to the mobile terminal 17a with the function permission number 2. Calling to the mobile terminals 17c, 17d to each of which no function permission number is set is not carried out.

In a case where any of the mobile terminals 17a to 17d to which the function permission number are respectively set is moved from the second floor to the first floor or from the first floor to the second floor, reassignment of the function permission numbers to all the mobile terminals 17a to 17d is carried out.

For example, the case where each of the mobile terminals 17a, 17b is moved from the second floor to the first floor and the mobile terminal 17d is moved from the first floor to the second floor as shown in FIG. 13 from a state that the function permission numbers shown in FIG. 12 are respectively set to the mobile terminals 17a to 17d will be described.

The rule to set the function permission numbers on the basis of the requirement described above is applied thereto. The function permission number 1 is set to the mobile terminal 17a of the father, which is moved from the second floor to the first floor, and the function permission number 2 is set to the mobile terminal 17d of the mother, which is moved from the first floor to the second floor. Further, as well as the case shown in FIG. 12, no function permission number is set to each of the mobile terminal 17b of the elder sister and the mobile terminal 17c of the younger sister.

After the reassignment of the function permission numbers, a calling operation according to the function permission numbers from the intercom 28 is the similar operation according to the above, and explanation for the calling operation is omitted herein.

Thus, it is possible to dynamically change the function permission number in response to the movement in the house 37 of only a specific mobile terminal, that is, the mobile terminals 17a, 17d owned by the parents herein, of the four mobile terminals 17a to 17d of the family. This makes it possible to make a response to the calling from the intercom 28 safe and secure.

The respective processes of the setting of the function permission numbers and the calling operation from the intercom 28 to each of the mobile terminals 17a, 17d, which are described above, will be described with reference to FIG. 14 and FIG. 15.

<Setting Process Example of Function Permission Number>

Figure 14:
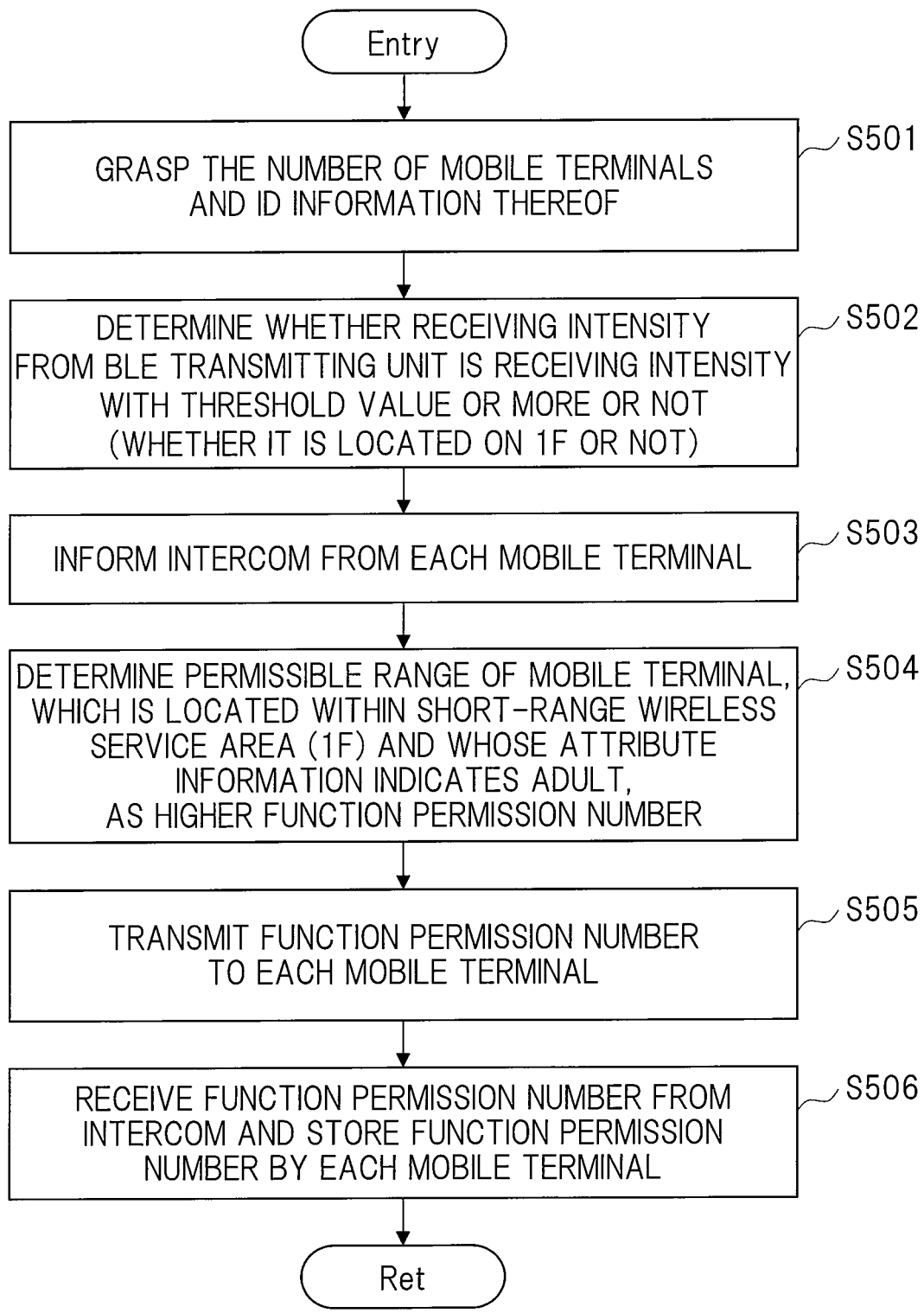
FIG. 14 is a flowchart showing one example of a setting process of a function permission number by a target operation device communicating system shown in FIG. 12.

FIG. 14 is a flowchart showing one example of a setting process for function permission numbers by the target operation device communicating system shown in FIG. 12.

The intercom 28 first obtains, by wireless LAN communication, the number of mobile terminals to each of which Wi-Fi wireless connection is established and ID information of each of the mobile terminals (Step S501).

Each of the mobile terminals 17a to 17d determines the corresponding receiving intensity (Step S502). In this process at Step S502, each mobile terminal receives a Bluetooth radio wave transmitted from a BLE transmitting unit 41 of a location specifying unit 40, and the CPU 11 measures receiving intensity thereof.

The CPU 11 then determines whether the measured receiving intensity is a threshold value set in advance or more or not. In a case where the receiving intensity is the threshold value or more, it is determined that it is located in the short-range wireless service area 36, that is, located on the first floor of the house 37. Further, in a case where the receiving intensity falls below the threshold value, it is determined that it is located outside a range of the short-range wireless service area 36, that is, located on the second floor of the house 37.

Then, each of the mobile terminals 17a to 17d carries out Wi-Fi communication with the intercom 28 to inform information on whether its own mobile terminal is located on the first floor of the house 37 or not (Step S503). At this time, the attribute of the user described above and stored in the ID number storing unit 3, that is, the information indicating whether to be an adult or a child is also transmitted.

The intercom 28 preferentially sets the function permission number 1 to the mobile terminal located in the short-range wireless service area 36, that is, located on the first floor of the house 37 and whose attribute information indicates an adult by means of the function permission number control unit 25 of FIG. 1 (Step S504). This attribute information becomes permission information.

Further, the mobile terminal that is located on the second floor of the house 37 and whose attribute information indicates the adult is set to the function permission number 2. No function permission number is set to each of the mobile terminals 17b, 17c whose attribute information indicates the child.

When the function permission numbers of the mobile terminals 17a, 17d are determined, the intercom 28 transmits the determined function permission number to each of the mobile terminals 17a to 17d via the Wi-Fi communication by using a MAC address, which is ID information of each of the mobile terminals 17a to 17d, as an index (Step S505).

Each of the mobile terminals 17a, 17d receives the corresponding function permission number transmitted by the wireless LAN 4 of FIG. 1 via the Wi-Fi communication. The function permission number changing unit 1 of FIG. 1 recognizes a function permission number corresponding to the received MAC address, and the function permission number is stored in the function permission number storing unit 2 of FIG. 1 (Step S506). In this regard, in the process at Step S506, information indicating that no function permission number is set thereto may be transmitted to each of the mobile terminals 17b, 17c.

The processes described above allow the function permission numbers to be set so as to preferentially call the mobile terminal 17d that is located on the first floor of the house 37 and not to call the mobile terminals 17b, 17c that are respectively owned by the children.

<Example of Process for Calling Operation>

Subsequently, the calling operation from the intercom 28 to the mobile terminals 17 to which the function permission numbers are respectively set will be described with reference to FIG. 15.

Figure 15:
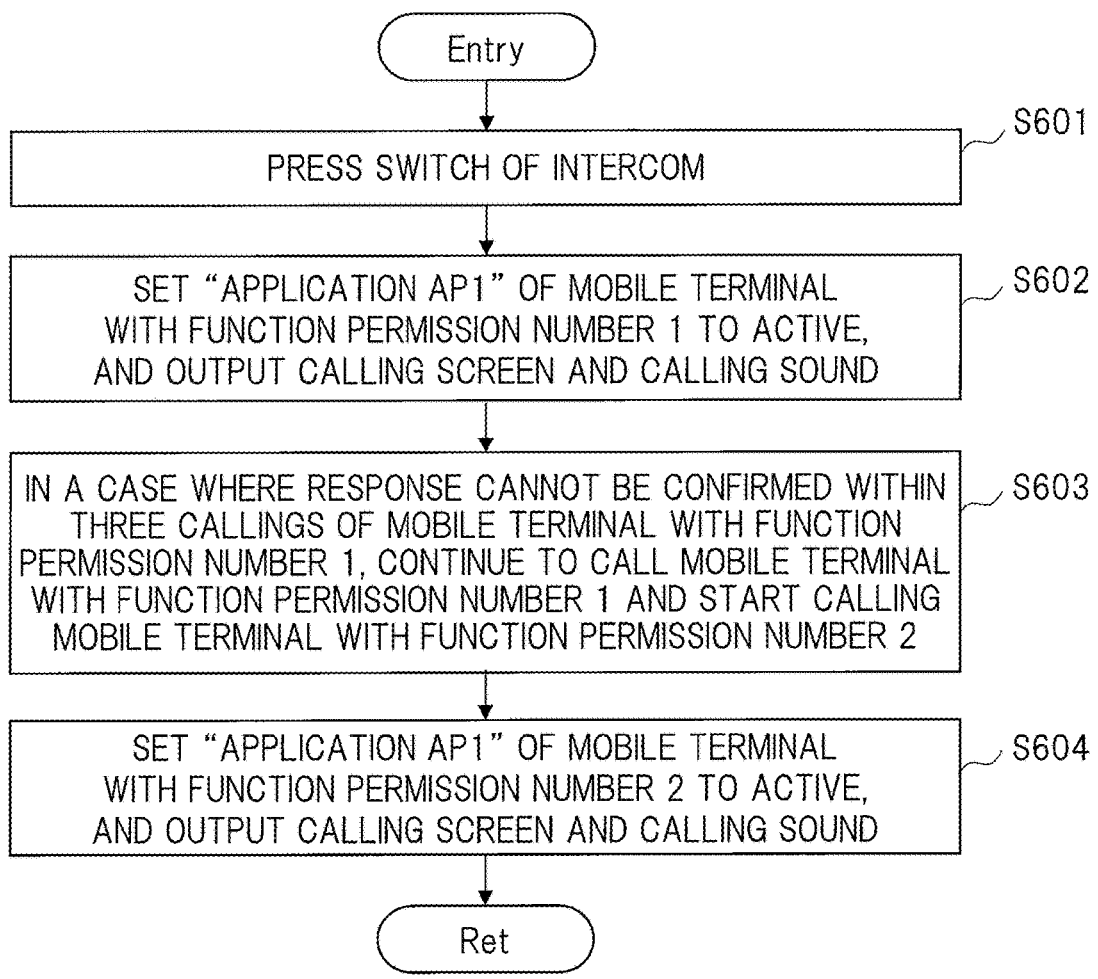
FIG. 15 is a flowchart showing one example of a calling process by the target operation device communicating system shown in FIG. 12.

FIG. 15 is a flowchart showing one example of a calling process by the target operation device communicating system shown in FIG. 12.

Here, in a calling process, which will be described below, processes of respective functions are also executed on the basis of software of a program form, which is stored in a program storing memory or the like (not shown in the drawings) that is provided in each of the mobile terminal 17 and the intercom 28.

These kinds of software are respectively executed by the CPU 11 of the mobile terminal 17 and the CPU 24 of the intercom 28. Further, the software for executing the functions described above may be downloaded via a communication line such as the Internet.

When a visitor or the like first operates the switch 27 of FIG. 7, which is a calling switch of the intercom 28 (Step S601), the intercom 28 transmits, from a wireless LAN 19, calling information for informing each of the mobile terminals 17a to 17d that the visitor operates the switch 27.

When each of the mobile terminals 17a to 17d receives the calling information on which information for calling the mobile terminal with the function permission number 1 is superimposed, it confirms the function permission number stored in the corresponding function permission number storing unit 2.

Then, when the mobile terminal to which the function permission number 1 is set, that is, the mobile terminal 17d in FIG. 12 recognizes that the function permission number thereof is 1, an application AP1 having a function to become a slave unit of the intercom is set to active.

This causes the display unit 16 of the mobile terminal 17d to display a calling screen from the intercom 28 thereon, and causes the speaker 13 to output a calling sound therefrom (Step S602).

In a case where there is no response by the mobile terminal 17d with the function permission number 1, the intercom 28 transmits the calling information to the mobile terminals 17a, 17b, 17c while continuing the calling operation to the mobile terminal 17d with the function permission number 1 (Step S603). Here, the calling to the mobile terminal 17d with the function permission number 1 is also carried out three times, for example.

Each of the mobile terminals 17a to 17c that receive the calling information confirms the function permission number stored in the function permission number storing unit 2. In FIG. 12, the function permission number 2 is set to the mobile terminal 17a. Therefore, when the mobile terminal 17a recognizes that the function permission number is 2, the application AP1 thereof is set to active.

Herewith, the mobile terminal 17a causes the display unit 16 to display a calling screen from the intercom 28 thereon, and causes the speaker 13 to output a calling sound therefrom (Step S604).

Further, since no function permission number is set to each of the mobile terminals 17b, 17c, the application AP1 is never set to active. As a result, calling to each of the mobile terminals 17b, 17c is not carried out.

This causes the calling process to the mobile terminals 17a to 17d to be terminated.

Further, the location specifying unit 40 installed on the first floor of the house 37 always outputs the Bluetooth radio wave from the BLE transmitting unit 41, and the mobile terminals in the house 37 always receives the Bluetooth radio wave.

Therefore, in a case where movement of any mobile terminal occurs, that is, when the mobile terminal is moved from the first floor to the second floor of the house 37 or from the second floor to the first floor, the mobile terminal transmits, to the intercom 28, the movement of the mobile terminal via the Wi-Fi communication.

Determination of whether to move from the first floor to the second floor or from the second floor to the first floor is carried out, in the similar manner to the process at Step S502 of FIG. 14, on the basis of whether receiving intensity of the Bluetooth radio wave is the threshold value or not or falls below the threshold value or not.

The intercom 28 again carries out the assigning process of the function permission numbers as a trigger that the mobile terminal informs to move. Since this reassigning process of the function permission numbers is similar to the process shown in FIG. 14, its explanation is omitted.

As described above, it is possible to specify a specific user such as an adult on the basis of the attribute information set to the mobile terminals, for example, to preferentially carry out the calling thereto from the intercom 28. This makes it possible for only the adults of the house 37 to deal with a sudden visitor quickly, and it is possible to realize safe and secure.

As described above, the present invention made by the present inventors has been explained specifically on the basis of the embodiments. However, the present invention is not limited to the embodiments, and it goes without saying that the present invention may be modified into various forms without departing from the substance thereof.

In each of the first to third embodiments, the example in which the target operation device is the intercom and the mobile terminals are used as the slave units of the intercom has been explained. However, the target operation device communicating system is not limited to this.

For example, the target operation device can be applied to various electric appliances such as a land-line phone, an air conditioner, lighting, or a television. Further, the mobile terminal, that is, the smartphone can be caused to function as a slave unit terminal of the land-line phone, an operation terminal of the air conditioner, an operation terminal of the lighting, or an operation terminal of the television.

In this regard, the present invention is not limited to the embodiments described above, and various modifications are contained. For example, the embodiments described above have been explained in detail for explaining the present invention clearly. The present invention is not necessarily limited to one that includes all configurations that have been explained.

Further, a part of the configuration of one embodiment can be replaced by a configuration of the other embodiment. Further, a configuration of the other embodiment can be added to a configuration of one embodiment. Moreover, a part of the configuration of each of the embodiments can be added to the other configuration, deleted or replaced thereby.

REFERENCE SINGS LIST 1 function permission number changing unit
2 function permission number storing unit
3 ID number storing unit
4 wireless LAN
5 BLE receiving unit
6 application storing unit
9 selector unit
10 memory
11 wireless LAN
12 microphone
13 speaker
15 input unit
16 display unit
17 mobile terminal
17a mobile terminal
17b mobile terminal
17c mobile terminal
17d mobile terminal
20 BLE transmitting unit
21 speaker
22 camera
23 memory
25 function permission number control unit
26 microphone
27 switch
28 intercom
36 short-range wireless service area
37 one's house
40 location specifying unit
41 BLE transmitting unit

The invention claimed is:

1. A target operation device communicating system comprising:
   a target operation device; and
   mobile terminals configured to operate in cooperation with the target operation device by communicating with the target operation device,
   wherein the target operation device includes:
   a function permission information control unit configured to generate cooperation information and first function permission information when to carry out a cooperated operation with any of the mobile terminals, the cooperation information being used to require the cooperated operation with the corresponding mobile terminal; and
   a first communicating unit configured to transmit the cooperation information and the first function permission information generated by the function permission information control unit to the corresponding mobile terminal,
   wherein each of the mobile terminals includes:
   a function permission information storing unit configured to store second function permission information that is set to the mobile terminal;
   an application storing unit configured to store an application to carry out a cooperated operation with the target operation device;
   a control unit configured to determine, when the first function permission information transmitted from the first communicating unit is received, whether the received first function permission information coincides with the second function permission information stored in the function permission information storing unit or not, the control unit being configured to set the application stored in the application storing unit to active in a case where the first function permission information coincides with the second function permission information; and a second communicating unit configured to receive the first function permission information transmitted by the first communicating unit, wherein the first function permission information is information that specifies the mobile terminal with which the target operation device carries out the cooperated operation, and wherein the second function permission information is information that indicates a function permission order when the target operation device carries out the cooperated operation.

2. The target operation device communicating system according to claim 1, wherein the function permission information control unit is configured to generate, when to carry out the cooperated operation with any of the mobile terminals, the first function permission information to carry out the cooperated operation with each of the mobile terminals in order from the mobile terminal with the highest function permission order.

3. The target operation device communicating system according to claim 1, wherein the target operation device further includes:

a transmitting unit configured to transmit a test wave to each of the mobile terminals; and a function permission information determining unit configured to determine the second function permission information on the basis of receiving intensity of the test wave transmitted by the second communicating unit, wherein each of the mobile terminals further includes:

a receiving unit configured to receive the test wave transmitted by the transmitting unit; and a measuring unit configured to measure receiving intensity of the test wave received by the receiving unit, wherein the function permission information determining unit is configured to determine the second function permission information so that the function permission order becomes higher in order from the mobile terminal with the strongest receiving intensity of the test wave, and wherein the second function permission information stored in the function permission information storing unit is the second function permission information determined by the function permission information determining unit.

4. The target operation device communicating system according to claim 1, wherein the target operation device further includes:

a transmitting unit configured to transmit a test wave to each of the mobile terminals; and a function permission information determining unit configured to determine the second function permission information on the basis of receiving intensity of the test wave received from the mobile terminal, wherein each of the mobile terminals further includes:

a receiving unit configured to receive the test wave transmitted by the transmitting unit; and a measuring unit configured to measure receiving intensity of the test wave received by the receiving unit to transmit the receiving intensity to the target operation device, wherein the function permission information determining unit is configured to detect a location of the mobile terminal on the basis of the receiving intensity of the test wave, and determine the second function permission information so that the function permission order of the mobile terminal located within a set area becomes the highest, and wherein the function permission information storing unit is configured to store the second function permission information determined by the function permission information determining unit.

5. The target operation device communicating system according to claim 1, wherein the target operation device further includes:

a transmitting unit configured to transmit a test wave to each of the mobile terminals; and a function permission information determining unit configured to determine the second function permission information on the basis of receiving intensity of the test wave received from the mobile terminal, wherein each of the mobile terminals further includes:

a receiving unit configured to receive the test wave transmitted by the transmitting unit;

an attribute information storing unit configured to store permission information that indicates whether to permit the cooperated operation with the target operation device or not; and a measuring unit configured to measure receiving intensity of the test wave received by the receiving unit, wherein the measuring unit fetches the permission information stored in the attribute information storing unit when the receiving intensity of the test wave is measured, and the receiving intensity of the test wave and the permission information are transmitted by the second communicating unit, wherein the function permission information determining unit is configured to: recognize, on the basis of the permission information, whether the mobile terminal is a mobile terminal for which the cooperated operation is permitted or not; detect a location of the mobile terminal on the basis of the receiving intensity of the test wave transmitted from the mobile terminal for which the cooperated operation is permitted; and determine the second function permission information so that the function permission order of the mobile terminal located within a set area becomes the highest, and wherein the function permission information storing unit is configured to store the second function permission information determined by the function permission information determining unit.

6. The target operation device communicating system according to claim 3, wherein the transmitting unit is configured to transmit the test wave via short-range wireless communication.

7. A target operation device communication cooperating method by a target operation device communicating system, the target operation device communicating system comprising a target operation device and mobile terminals configured to operate in cooperation with the target operation device by communicating with the target operation device, the method comprising:

generating, by the target operation device, cooperation information and first function permission information when to carry out a cooperated operation with any of the mobile terminals, and transmitting the cooperation information and the first function permission information to the corresponding mobile terminal, the cooperation information being used to require the cooperated operation with the corresponding mobile terminal; and when the first function permission information is received from the target operation device, determining, by the mobile terminal, whether the received first function permission information coincides with second function permission information set to the corresponding mobile terminal in advance or not, and setting an application for carrying out a cooperated operation with the target operation device to active in a case where the received first function permission information coincides with the second function permission information, wherein the first function permission information is information that specifies the mobile terminal with which the target operation device carries out the cooperated operation, and wherein the second function permission information is information that indicates a function permission order when the target operation device carries out the cooperated operation.

8. The target operation device communication cooperating method according to claim 7, further comprising:

transmitting, by the target operation device, a test wave to each of the mobile terminals;

receiving, by each of the mobile terminals, the test wave transmitted from the target operation device;

measuring, by each of the mobile terminals, receiving intensity of the received test wave to transmit the receiving intensity to the target operation device; and determining, by the target operation device, the second function permission information on the basis of the receiving intensity of the test wave that is transmitted from the mobile terminal, wherein the determining the second function permission information is configured to determine the second function permission information so that the function permission order becomes higher in order from the mobile terminal with strong receiving intensity of the test wave.

9. The target operation device communication cooperating method according to claim 7, further comprising:

transmitting, by the target operation device, a test wave to each of the mobile terminals;

receiving, by each of the mobile terminals, the test wave transmitted by the target operation device;

measuring, by each of the mobile terminals, receiving intensity of the received test wave to transmit the receiving intensity to the target operation device; and determining, by the target operation device, the second function permission information on the basis of the receiving intensity of the test wave that is transmitted from the mobile terminal, wherein the determining the second function permission information is configured to detect a location of the mobile terminal on the basis of the receiving intensity of the test wave, and determine the second function permission information so that the function permission order of the mobile terminal located within a set area becomes the highest.

10. The target operation device communication cooperating method according to claim 7, further comprising:

transmitting, by the target operation device, a test wave to each of the mobile terminals;

receiving, by each of the mobile terminals, the test wave transmitted by the target operation device;

measuring, by the mobile terminal, receiving intensity of the received test wave;

transmitting, by each of the mobile terminals, the measured receiving intensity and permission information to the target operation device, the permission information indicating whether a cooperated operation set in advance is permitted or not;

recognizing, by the target operation device, a mobile terminal for which the cooperated operation is permitted on the basis of the permission information;

determining, by the target operation device, the second function permission information of the mobile terminal for which the cooperated operation is permitted on the basis of the receiving intensity of the test wave transmitted from the recognized mobile terminal for which the cooperated operation is permitted; and transmitting, by the target operation device, the determined second function permission information to the mobile terminal, wherein the determining the second function permission information is configured to detect a location of the mobile terminal on the basis of the receiving intensity of the test wave, and determine the second function permission information so that the function permission order of the mobile terminal located within a set area becomes the highest.

11. A mobile terminal configured to operate in cooperation with a target operation device by communicating with the target operation device, the mobile terminal comprising:

a function permission information storing unit configured to store second function permission information that is set to the mobile terminal;

an application storing unit configured to store an application to carryout a cooperated operation with the target operation device; and a control unit configured to determine, when first function permission information transmitted from the target operation device is received, whether the received first function permission information coincides with the second function permission information stored in the function permission information storing unit or not, the control unit being configured to set the application stored in the application storing unit to active in a case where the first function permission information coincides with the second function permission information, wherein the first function permission information is information that that specifies the mobile terminal with which the target operation device carries out the cooperated operation, and wherein the second function permission information is information that indicates a function permission order when the target operation device carries out the cooperated operation.

12. The mobile terminal according to claim 11, further comprising:

a receiving unit configured to receive a test wave transmitted by the target operation device; and a measuring unit configured to measure receiving intensity of the test wave received by the receiving unit, wherein the second function permission information stored in the function permission information storing unit is information that the target operation device determines, on the basis of the receiving intensity of the test wave measured by the measuring unit and transmitted from the mobile terminal, so that the function permission order becomes higher in order from the mobile terminal with the strongest receiving intensity of the test wave.

13. The mobile terminal according to claim 11, further comprising:

a receiving unit configured to receive a test wave transmitted by the target operation device; and a measuring unit configured to measure receiving intensity of the test wave received by the receiving unit to transmit the receiving intensity to the target operation device, wherein the second function permission information stored in the function permission information storing unit is information that the target operation device determines so that the function permission order of the mobile terminal located within a set area becomes the highest by detecting a location of the mobile terminal on the basis of the receiving intensity of the test wave measured by the measuring unit and transmitted from the mobile terminal.

14. The mobile terminal according to claim 11, further comprising:

a receiving unit configured to receive a test wave transmitted by the transmitting unit;

an attribute information storing unit configured to store permission information that indicates whether to permit the cooperated operation with the target operation device or not; and a measuring unit configured to measure receiving intensity of the test wave received by the receiving unit, wherein the measuring unit fetches the permission information stored in the attribute information storing unit when the receiving intensity of the test wave is measured, and the receiving intensity of the test wave and the permission information are transmitted to the target operation device, and wherein the second function permission information stored in the function permission information storing unit is information that the target operation device determines so that the function permission order of the mobile terminal located within a set area becomes the highest by recognizing, on the basis of the permission information, whether the mobile terminal is a mobile terminal for which the cooperated operation is permitted or not and detecting a location of the mobile terminal on the basis of the receiving intensity of the test wave transmitted from the mobile terminal for which the cooperated operation is permitted.

15. The mobile terminal according to claim 12, wherein the receiving unit is configured to receive the test wave by short-range wireless communication.

\* \* \* \* \*